(12) United States Patent
Ravasz et al.

(10) Patent No.: US 10,890,983 B2
(45) Date of Patent: Jan. 12, 2021

(54) ARTIFICIAL REALITY SYSTEM HAVING A SLIDING MENU

(71) Applicant: Facebook Technologies, LLC, Menlo Park, CA (US)

(72) Inventors: Jonathan Ravasz, London (GB); Jasper Stevens, London (GB); Adam Tibor Varga, London (GB); Etienne Pinchon, London (GB); Simon Charles Tickner, Canterbury (GB); Jennifer Lynn Spurlock, Seattle, WA (US); Kyle Eric Sorge-Toomey, Seattle, WA (US); Robert Ellis, London (GB); Barrett Fox, Berkeley, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/434,919

(22) Filed: Jun. 7, 2019

(65) Prior Publication Data
US 2020/0387228 A1    Dec. 10, 2020

(51) Int. Cl.
*G06F 3/01* (2006.01)
*G06F 3/0484* (2013.01)
*G06T 19/00* (2011.01)

(52) U.S. Cl.
CPC .............. *G06F 3/017* (2013.01); *G06F 3/012* (2013.01); *G06F 3/04847* (2013.01); *G06T 19/006* (2013.01)

(58) Field of Classification Search
CPC ............................. G06T 19/003; G06T 19/006
(Continued)

(56) References Cited

U.S. PATENT DOCUMENTS 9,477,303 B2 * 10/2016 Fleischmann ........... G06T 17/00
2012/0071892 A1 * 3/2012 Itkowitz ................. A61B 34/35
606/130
(Continued)

FOREIGN PATENT DOCUMENTS

EP          3155560 B1     5/2020

OTHER PUBLICATIONS

International Search Report and Written Opinion of International Application No. PCT/US2020/035998, dated Sep. 30, 2020, 16 pp.
(Continued)

*Primary Examiner* — Thomas J Lett
(74) *Attorney, Agent, or Firm* — Shumaker & Sieffert, P.A.

(57) ABSTRACT

An artificial reality system is described that renders, presents, and controls user interface elements within an artificial reality environment, and performs actions in response to one or more detected gestures of the user. The artificial reality system can include a menu that can be activated and interacted with using one hand. In response to detecting a menu activation gesture performed using one hand, the artificial reality system can cause a menu to be rendered. A menu sliding gesture (e.g., horizontal motion) of the hand can be used to cause a slidably engageable user interface (UI) element to move along a horizontal dimension of the menu while horizontal positioning of the UI menu is held constant. Motion of the hand orthogonal to the menu sliding gesture (e.g., non-horizontal motion) can cause the menu to be repositioned. The implementation of the artificial reality system does require use of both hands or use of other input devices in order to interact with the artificial reality system.

18 Claims, 15 Drawing Sheets

(58) Field of Classification Search
USPC .......................................................... 345/633
See application file for complete search history.

(56) References Cited

U.S. PATENT DOCUMENTS

| | | | | |
|---|---|---|---|---|
| 2012/0249740 | A1* | 10/2012 | Lee | H04N 13/254 348/46 |
| 2012/0249741 | A1* | 10/2012 | Maciocci | G06F 3/017 348/46 |
| 2015/0243100 | A1* | 8/2015 | Abovitz | G02B 27/4205 345/633 |
| 2017/0228130 | A1* | 8/2017 | Palmaro | G06F 3/04815 |
| 2019/0130653 | A1* | 5/2019 | Kuehne | G06Q 10/20 |

OTHER PUBLICATIONS

Fox et al., "Designing Singlehanded Shortcuts for VR & AR", May 10, 2018, retrieved from https://www.roadtovr.com/leap-motion-designing-single-handed-shortcuts-for-vr-ar/, Oct. 27, 2020, pp. 18.

Lang, Ben, "Leap Motion Virtual Wearable AR Prototype is a Potent Glimpse at the Future of Your Smartphone" Mar. 24, 2018, Retrieved from https://www.roadtovr.com/leap-motion-virtual-wearable-ar-prototype-glimpse-of-future-smartphone/, retrieved on Oct. 27, 2020, pp. 6.

YouTube, Matsuda, Keiichi, "Augmented City 3D [Official]", retrieved from https://www.youtube.com/watch?v=3TL80ScTLIM, Aug. 20, 2010, 1p.

YouTube, Newton, Andrew, "Immersive Menus Demo", retrieved from https://www.youtube.com/watch?v=_ow1RboHJDY, Oct. 8, 2017, p. 1.

* cited by examiner

ARTIFICIAL REALITY SYSTEM HAVING A SLIDING MENU

TECHNICAL FIELD

This disclosure generally relates to artificial reality systems, such as virtual reality, mixed reality, and/or augmented reality systems, and more particularly, to user interfaces of artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The artificial reality content may include completely-generated content or generated content combined with captured content (e.g., real-world video and/or images). During operation, the user typically interacts with the artificial reality system to select content, launch applications or otherwise configure the system.

SUMMARY

In general, this disclosure describes artificial reality systems and, more specifically, graphical user interface elements and techniques for presenting and controlling the user interface elements within an artificial reality environment.

For example, artificial reality systems are described that generate and render graphical user interface elements for display to a user in response to detection of one or more pre-defined gestures by the user, such as particular motions, configurations, positions, and/or orientations of the user's hands, fingers, thumbs or arms, or a combination of pre-defined gestures. In some examples, the artificial reality system may further trigger generation and rendering of the graphical user interface elements in response to detection of particular gestures in combination with other conditions, such as the position and orientation of the particular gestures in a physical environment relative to a current field of view of the user, which may be determined by real-time gaze tracking of the user, or relative to a pose of an HMD worn by the user.

In some examples, the artificial reality system may generate and present the graphical user interface elements as overlay elements with respect to the artificial reality content currently being rendered within the display of the artificial reality system. The graphical user interface elements may, for example, be a graphical user interface, such as a menu or sub-menu with which the user interacts to operate the artificial reality system, or individual graphical user interface elements selectable and manipulatable by a user, such as toggle elements, drop-down elements, menu selection elements, two-dimensional or three-dimensional shapes, graphical input keys or keyboards, content display windows and the like.

A technical problem with some HMDs is the lack of input devices that can be used to interact with aspects of the artificial reality system, for example, to position a selection user interface element within a menu. In some systems, the artificial reality system can use both hands of a user to provider user interaction with menus or icons. However, a technical problem with this type of interaction is that one hand can occlude the other hand, making it difficult for the artificial reality system to accurately determine the intent of the user. Additionally, some users may have a disability that may prevent them from using both hands to interact with the artificial reality system. As a technical solution to the aforementioned technical problems, some aspects include a menu that can be activated and interacted with using one hand. In response to detecting a menu activation gesture performed using one hand, the artificial reality system may cause a menu to be rendered. A menu sliding gesture (e.g., horizontal motion) of the hand may be used to cause a slidably engageable user interface (UI) element to move along a horizontal dimension of the menu while horizontal positioning of the menu is held constant. In some aspects, motion of the hand substantially orthogonal to the menu sliding gesture (e.g., non-horizontal motion) may cause the menu to be repositioned. The implementation of the artificial reality system does not require use of both hands or use of other input devices in order to interact with the artificial reality system and thus this technical improvement over conventional artificial reality implementations may provide one or more practical applications, such as providing ease of use, providing the ability for persons with disabilities related to the use of one hand to interact with the system, and the ability to accurately determine user interaction with a menu or other user interface elements.

In one or more example aspects, an artificial reality system includes an image capture device configured to capture image data; a head mounted device (HMD) configured to output artificial reality content; a gesture detector configured to identify, from the image data, a menu activation gesture comprising a configuration of a hand in a substantially upturned orientation of the hand and a pinching configuration of a thumb and a finger of the hand; a UI engine configured to, in response to the menu activation gesture, generate a menu interface and a slidably engageable UI element at a first position relative to the menu interface; and a rendering engine configured to render the artificial reality content, the menu interface, and the slidably engageable UI element for display at the HMD.

In one or more further example aspects, a method includes obtaining, by an artificial reality system including a head mounted device (HMD), image data via an image capture device; identifying, by the artificial reality system from the image data, a menu activation gesture, the menu activation gesture comprising a configuration of a hand in a substantially upturned orientation of the hand and a pinching configuration of a thumb and a finger of the hand; generating, by the artificial reality system in response to the menu activation gesture, a menu interface and a slidably engageable UI element at a first position relative to the menu interface; and rendering, by the artificial reality system, artificial reality content, the menu interface, and the slidably engageable UI element for display at the HMD.

In one or more additional example aspects, a non-transitory, computer-readable medium comprises instructions that, when executed, cause one or more processors of an artificial reality system to capture image data via an image capture device; identify, from the image data, a menu activation gesture comprising a configuration of the hand; in response to the menu activation gesture, generate a menu interface and a slidably engageable UI element at a first position relative to the menu interface; identify, subsequent to the menu activation gesture, a menu sliding gesture comprising the configuration of the hand in combination with a motion of the hand; in response to the menu sliding gesture, translate the slidably engageable UI element to a second position relative to the menu interface; and render artificial reality content, the menu interface, and the slidably engageable UI element for display at a head mounted device (HMD).

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
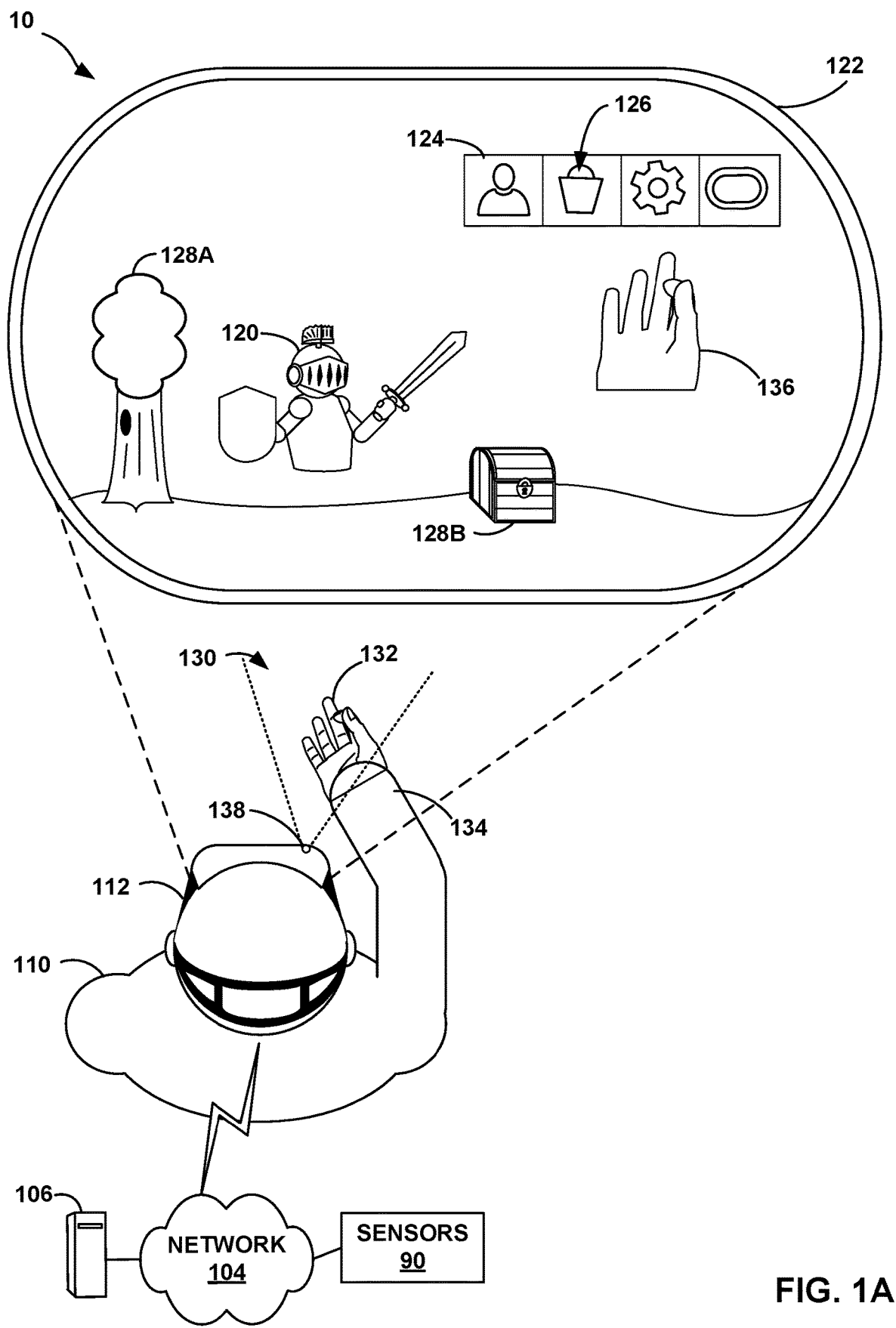
FIG. 1A is an illustration depicting an example artificial reality system that presents and controls user interface elements within an artificial reality environment in accordance with the techniques of the disclosure.

FIG. 1A is an illustration depicting an example artificial reality system 10 that presents and controls user interface elements within an artificial reality environment in accordance with the techniques of the disclosure. In some example implementations, artificial reality system 10 generates and renders graphical user interface elements to a user 110 in response to one or more detected gestures performed by user 110. That is, as described herein, artificial reality system 10 presents one or more graphical user interface elements 124, 126 in response to detecting one or more particular gestures performed by user 110, such as particular motions, configurations, locations, and/or orientations of the user's hands, fingers, thumbs or arms. In other examples, artificial reality system 10 presents and controls user interface elements specifically designed for user interaction and manipulation within an artificial reality environment, such as specialized toggle elements, drop-down elements, menu selection elements, graphical input keys or keyboards, content display windows and the like.

In the example of FIG. 1A, artificial reality system 10 includes head mounted device (HMD) 112, console 106 and, in some examples, one or more external sensors 90. As shown, HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 138, e.g., cameras, line scanners and the like, for capturing image data of the surrounding physical environment. In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on console 106 and/or HMD 112. As one example, artificial reality content 122 may be a consumer gaming application in which user 110 is rendered as avatar 120 with one or more virtual objects 128A, 128B. In some examples, artificial reality content 122 may comprise a mixture of real-world imagery and virtual objects, e.g., mixed reality and/or augmented reality. In other examples, artificial reality content 122 may be, e.g., a video conferencing application, a navigation application, an educational application, training or simulation applications, or other types of applications that implement artificial reality.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Moreover, in accordance with the techniques of this disclosure, based on the sensed data, the artificial reality application detects gestures performed by user 110 and, in response to detecting one or more particular gestures, generates one or more user interface elements, e.g., UI menu 124 and UI element 126, which may be overlaid on underlying artificial reality content 122 being presented to the user. In this respect, user interface elements 124, 126 may be viewed as part of the artificial reality content 122 being presented to the user in the artificial reality environment. In this way, artificial reality system 10 dynamically presents one or more graphical user interface elements 124, 126 in response to detecting one or more particular gestures by user 110, such as particular motions, configurations, positions, and/or orientations of the user's hands, fingers, thumbs or arms. Example configurations of a user's hand may include a fist, one or more digits extended, the relative and/or absolute positions and orientations of one or more of the individual digits of the hand, the shape of the palm of the hand, and so forth. The user interface elements may, for example, be a graphical user interface, such as a menu or sub-menu with which user 110 interacts to operate the artificial reality system, or individual user interface elements selectable and manipulatable by user 110, such as icon elements, toggle elements, drop-down elements, menu selection elements, two-dimensional or three-dimensional shapes, graphical input keys or keyboards, content display windows and the like. While depicted as a two-dimensional element, for example, UI element 126 may be a two-dimensional or three-dimensional shape that is manipulatable by a user performing gestures to translate, scale, and/or rotate the shape in the artificial reality environment.

Moreover, as described herein, in some examples, artificial reality system 10 may trigger generation and rendering of graphical user interface elements 124, 126 in response to other conditions, such as a current state of one or more applications being executed by the system, or the position and orientation of the particular detected gestures in a physical environment in relation to a current field of view 130 of user 110, as may be determined by real-time gaze tracking of the user, or other conditions.

More specifically, as further described herein, image capture devices 138 of HMD 112 capture image data representative of objects in the real world, physical environment that are within a field of view 130 of image capture devices 138. Field of view 130 typically corresponds with the viewing perspective of HMD 112. In some examples, such as the illustrated example of FIG. 1A, the artificial reality application renders the portions of hand 132 of user 110 that are within field of view 130 as a virtual hand 136 within artificial reality content 122. In other examples, the artificial reality application may present a real-world image of hand 132 and/or arm 134 of user 110 within artificial reality content 122 comprising mixed reality and/or augmented reality. In either example, user 110 is able to view the portions of their hand 132 and/or arm 134 that are within field of view 130 as objects within artificial reality content 122.

In other examples, the artificial reality application may not render representations of the hand 132 or arm 134 of the user.

In any case, during operation, artificial reality system 10 performs object recognition within image data captured by image capture devices 138 of HMD 112 to identify hand 132, including optionally identifying individual fingers or the thumb, and/or all or portions of arm 134 of user 110. Further, artificial reality system 10 tracks the position, orientation, and configuration of hand 132 (optionally including particular digits of the hand) and/or portions of arm 134 over a sliding window of time. The artificial reality application analyzes any tracked motions, configurations, positions, and/or orientations of hand 132 and/or portions of arm 134 to identify one or more gestures performed by particular objects, e.g., hand 132 (including particular digits of the hand) and/or portions of arm 134 of user 110. To detect the gesture(s), the artificial reality application may compare the motions, configurations, positions and/or orientations of hand 132 and/or portions of arm 134 to gesture definitions stored in a gesture library of artificial reality system 10, where each gesture in the gesture library may be mapped to one or more actions. In some examples, detecting movement may include tracking positions of one or more of the digits (individual fingers and thumb) of hand 132, including whether any of a defined combination of the digits (such as an index finger and thumb) are brought together to touch or approximately touch in the physical environment. In other examples, detecting movement may include tracking an orientation of hand 132 (e.g., fingers pointing toward HMD 112 or away from HMD 112) and/or an orientation of arm 134 (i.e., the normal of the arm facing toward HMD 112) relative to the current pose of HMD 112. The position and orientation of hand 132 (or a portion thereof) thereof may alternatively be referred to as the pose of hand 132 (or a portion thereof).

Moreover, the artificial reality application may analyze configurations, positions, and/or orientations of hand 132 and/or arm 134 to identify a gesture that includes hand 132 and/or arm 134 being held in one or more specific configurations, positions, and/or orientations for at least a threshold period of time. As examples, one or more particular positions at which hand 132 and/or arm 134 are being held substantially stationary within field of view 130 for at least a configurable period of time may be used by artificial reality system 10 as an indication that user 110 is attempting to perform a gesture intended to trigger a desired response by the artificial reality application, such as triggering display of a particular type of user interface element 124, 126, such as a menu. As another example, one or more particular configurations of the fingers and/or palms of hand 132 and/or arm 134 being maintained within field of view 130 for at least a configurable period of time may be used by artificial reality system 10 as an indication that user 110 is attempting to perform a gesture. Although only right hand 132 and right arm 134 of user 110 are illustrated in FIG. 1A, in other examples, artificial reality system 10 may identify a left hand and/or arm of user 110 or both right and left hands and/or arms of user 110. In this way, artificial reality system 10 may detect single-handed gestures performed by either hand, double-handed gestures, or arm-based gestures within the physical environment, and generate associated user interface elements in response to the detected gestures.

In accordance with the techniques of this disclosure, the artificial reality application determines whether an identified gesture corresponds to a gesture defined by one of a plurality of entries in a gesture library of console 106 and/or HMD 112. As described in more detail below, each of the entries in the gesture library may define a different gesture as a specific motion, configuration, position, and/or orientation of a user's hand, digit (finger or thumb) and/or arm over time, or a combination of such properties. In addition, each of the defined gestures may be associated with a desired response in the form of one or more actions to be performed by the artificial reality application. As one example, one or more of the defined gestures in the gesture library may trigger the generation, transformation, and/or configuration of one or more user interface elements, e.g., UI menu 124, to be rendered and overlaid on artificial reality content 122, where the gesture may define a location and/or orientation of UI menu 124 in artificial reality content 122. As another example, one or more of the defined gestures may indicate an interaction by user 110 with a particular user interface element, e.g., selection of UI element 126 of UI menu 124, to trigger a change to the presented user interface, presentation of a sub-menu of the presented user interface, or the like.

In some aspects, the artificial reality application may analyze configurations, positions, and/or orientations of hand 132 and/or arm 134 to identify a menu activation gesture that includes hand 132 being held in a specific configuration and orientation for at least a threshold period of time. In some aspects, the menu activation gesture may, for example, be a hand being held in a substantially upward position while a finger and thumb of the hand are in a pinching configuration. In some aspects, the menu activation gesture may comprise a finger and the thumb of the hand positioned in a pinching configuration irrespective of the orientation of the hand. A menu sliding gesture may cause a virtual hand that moves in accordance with the user's hand to slide along a dimension of the UI menu 124 while the menu remains stationary in the sliding direction. Motion in directions other than the menu sliding gesture may cause the UI menu 124 to be repositioned based on the motion. As an example, the menu sliding gesture may be motion of the user's hand 132 in a horizontal direction while maintaining the menu activation gesture. The virtual hand 136 may move along the horizontal dimension while the menu remains stationary in the horizontal direction. In some examples, the artificial reality application generates a slidably engageable UI element (not shown in FIG. 1) in addition to, or alternatively to, the virtual hand 136. Movement in the vertical direction may cause the UI menu 124 to be repositioned.

The menu sliding gesture while maintaining the menu activation gesture may cause the artificial reality application to render an indication that a particular menu item of the UI menu 124 would be selected if the user were to perform a selection gesture without further performing the menu sliding gesture to slide the virtual hand 132, e.g., to a different location proximate to a different menu item of the UI menu 124. That particular menu is primed for selection by the user. The indication may be a location of the virtual hand 132 or a slidably engageable UI element being proximate to the menu item; highlighting of the menu item with a different color, for instance; enlargement of the menu item; or some other indication.

Accordingly, the techniques of the disclosure provide specific technical improvements to the computer-related field of rendering and displaying content by an artificial reality system. For example, artificial reality systems as described herein may provide a high-quality artificial reality experience to a user, such as user 110, of the artificial reality application by generating and rendering user interface elements overlaid on the artificial reality content based on detection of intuitive, yet distinctive, gestures performed by the user. More specifically, the techniques may provide the user with intuitive user input in the form of gestures by which the user may activate a menu interface and subsequently translate, along a dimension of the menu, a slidably engageable UI element or other indication of the menu item primed for selection by the user.

Further, systems as described herein may be configured to detect certain gestures based on hand and arm movements that are defined to avoid tracking occlusion. Tracking occlusion may occur when one hand of the user at least partially overlaps the other hand, making it difficult to accurately track the individual digits (fingers and thumb) on each hand, as well as the position and orientation of each hand. Systems as described herein, therefore, may be configured to primarily detect single-handed or single arm-based gestures. The use of single-handed or single arm-based gestures may further provide enhanced accessibility to users having large- and fine-motor skill limitations. Furthermore, systems as described herein may be configured to detect double-handed or double arm-based gestures in which the hands of the user do not interact or overlap with each other.

In addition, systems as described herein may be configured to detect gestures that provide self-haptic feedback to the user. For example, a thumb and one or more fingers on each hand of the user may touch or approximately touch in the physical world as part of a pre-defined gesture indicating an interaction with a particular user interface element in the artificial reality content. The touch between the thumb and one or more fingers of the user's hand may provide the user with a simulation of the sensation felt by the user when interacting directly with a physical user input object, such as a button on a physical keyboard or other physical input device.

Figure 1B:
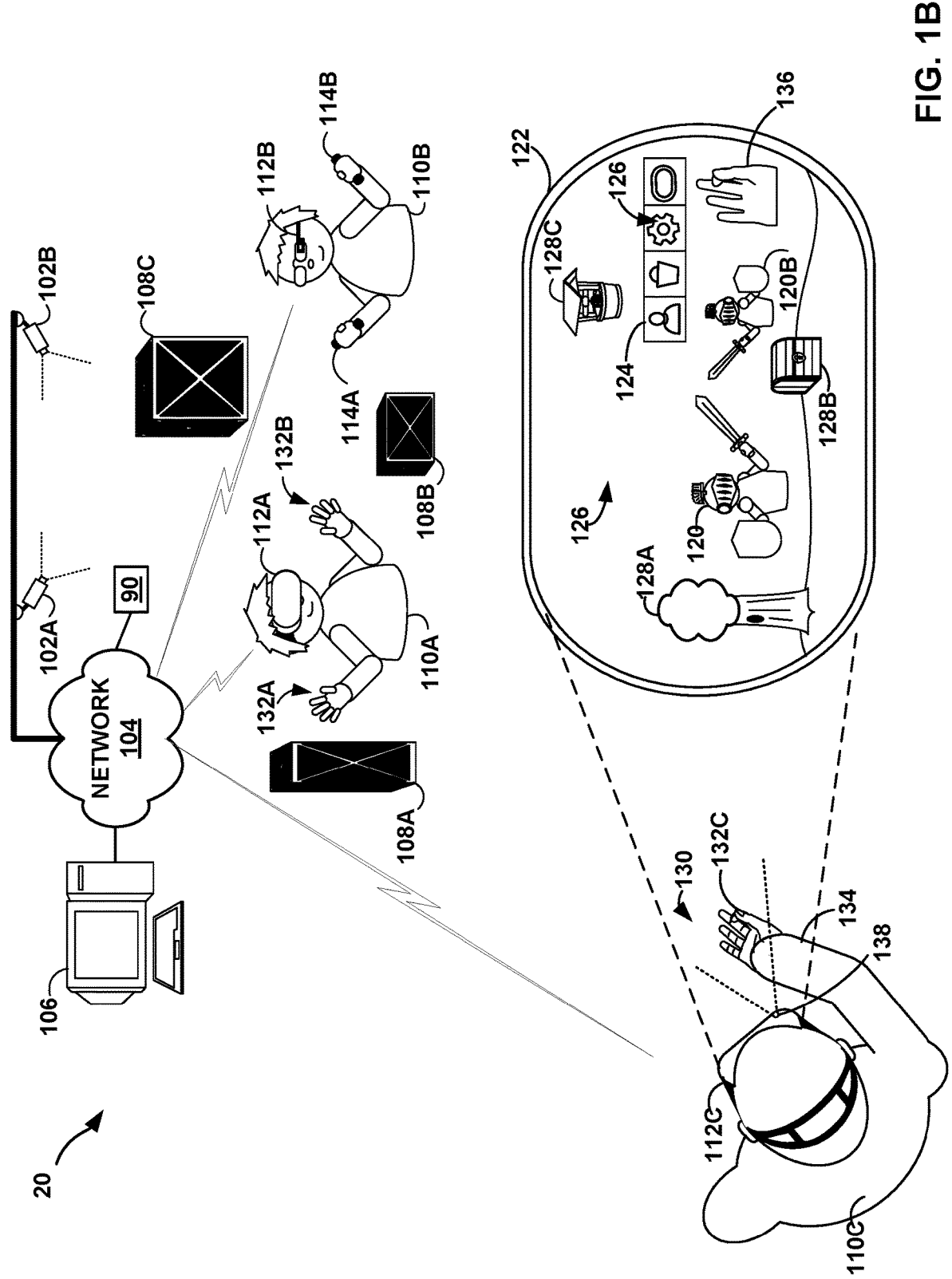
FIG. 1B is an illustration depicting another example artificial reality system in accordance with the techniques of the disclosure.

FIG. 1B is an illustration depicting another example artificial reality system 20 in accordance with the techniques of the disclosure. Similar to artificial reality system 10 of FIG. 1A, in some examples, artificial reality system 20 of FIG. 1B may present and control user interface elements specifically designed for user interaction and manipulation within an artificial reality environment. Artificial reality system 20 may also, in various examples, generate and render certain graphical user interface elements to a user in response to detection of one or more particular gestures of the user.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128C (collectively, "virtual objects 128") as spatially overlaid upon real world objects 108A-108C (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C, and rendering the portions of hand 132 that are within field of view 130 as virtual hand 136 within artificial reality content 122. HMD 112B may receive user inputs from controllers 114A held by user 110B. HMD 112A may also operate substantially similar to HMD 112 of FIG. 1A and receive user inputs in the form of gestures by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders user interface elements 124, 126, which may be overlaid upon the artificial reality content 122 displayed to user 110C. Moreover, console 106 and/or HMD 112C may trigger the generation and dynamic display of the user interface elements 124, 126 based on detection, via pose tracking, of intuitive, yet distinctive, gestures performed by user 110C. For example, artificial reality system 20 may dynamically present one or more graphical user interface elements 124, 126 in response to detecting one or more particular gestures by user 110C, such as particular motions, configurations, positions, and/or orientations of the user's hands, fingers, thumbs or arms. As shown in FIG. 1B, in addition to or alternatively to image data captured via camera 138 of HMD 112C, input data from external cameras 102 may be used to track and detect particular motions, configurations, positions, and/or orientations of hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify menu prompt gestures, menu activation gestures, menu sliding gestures, selection gestures, or menu positioning motions, etc. that may be performed by a user of HMD 112A. Similarly, HMD 112C can utilize image capture device 138 to analyze configurations, positions, and/or orientations of hand 132C to identify menu prompt gestures, menu activation gestures, menu sliding gestures, selection gestures, or menu positioning motions, etc., that may be performed by a user of HMD 112C. The artificial reality application may render UI menu 124 and virtual hand 136, responsive to such gestures, in a manner similar to that described above with respect to FIG. 1A.

Figure 2:
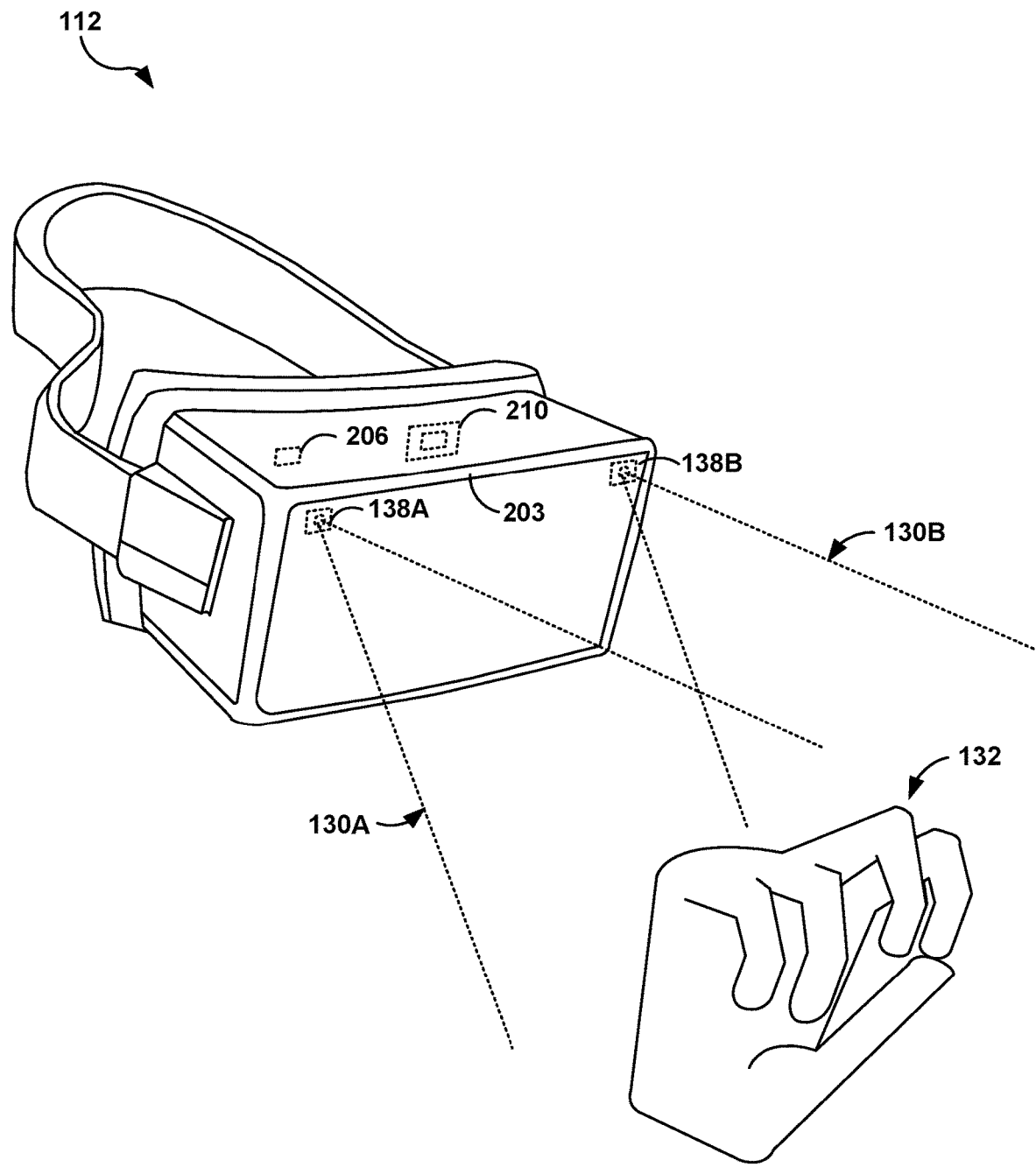
FIG. 2 is an illustration depicting an example HMD that operates in accordance with the techniques of the disclosure.

FIG. 2 is an illustration depicting an example HMD 112 configured to operate in accordance with the techniques of the disclosure. HMD 112 of FIG. 2 may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the sensed data, identify a specific gesture or combination of gestures performed by the user and, in response, perform an action. For example, in response to one identified gesture, control unit 210 may generate and render a specific user interface element overlaid on artificial reality content for display on electronic display 203. As explained herein, in accordance with the techniques of the disclosure, control unit 210 may perform object recognition within image data captured by image capture devices 138 to identify a hand 132, fingers, thumb, arm or another part of the user, and track movements, positions, configuration, etc., of the identified part(s) to identify pre-defined gestures performed by the user. In response to identifying a pre-defined gesture, control unit 210 takes some action, such as selecting an option from an option set associated with a user interface element, translating the gesture into input (e.g., characters), launching an application or otherwise displaying content, and the like. In some examples, control unit 210 dynamically generates and presents a user interface element, such as a menu, in response to detecting a pre-defined gesture specified as a "trigger" for revealing a user interface. In other examples, control unit 210 performs such functions in response to direction from an external device, such as console 106, which may perform, object recognition, motion tracking and gesture detection, or any part thereof.

As an example, control unit 210 can utilize image capture devices 138A and 138B to analyze configurations, positions, movements, and/or orientations of hand 132 and/or arm 134 to identify a menu prompt gesture, menu activation gesture, menu sliding gesture, selection gesture, or menu positioning motions, etc., that may be performed by users of HMD 112. The control unit 210 can render a UI menu, slidably engageable UI element, and/or virtual hand based on detection of the menu prompt gesture, menu activation gesture, menu sliding gesture, selection gesture, and menu positioning motions.

Figure 3:
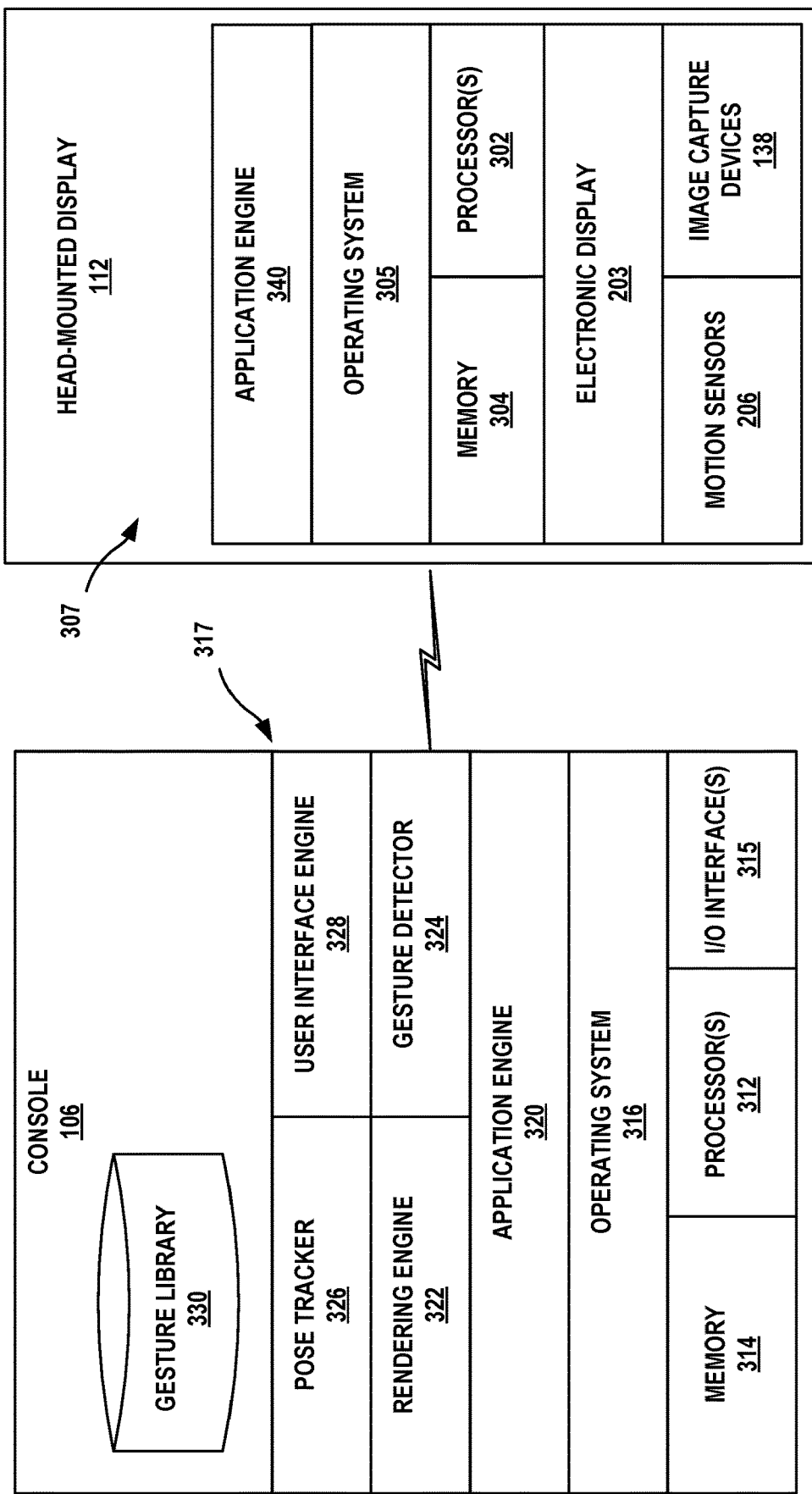
FIG. 3 is a block diagram showing example implementations of a console and an HMD of the artificial reality systems of FIGS. 1A, 1B.

FIG. 3 is a block diagram showing example implementations of console 106 and HMD 112 of artificial reality system 10, 20 of FIGS. 1A, 1B. In the example of FIG. 3, console 106 performs pose tracking, gesture detection, and user interface generation and rendering for HMD 112 in accordance with the techniques described herein based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the example of FIG. 2, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform gesture detection and user interface generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Moreover, based on the sensed data, gesture detector 324 analyzes the tracked motions, configurations, positions, and/or orientations of objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify a hand and/or arm of user 110, and track movements of the hand and/or arm relative to HMD 112 to identify gestures performed by user 110. Gesture detector 324 may track movement, including changes to position and orientation, of the hand, digits, and/or arm based on the captured image data, and compare motion vectors of the objects to one or more entries in gesture library 330 to detect a gesture or combination of gestures performed by user 110. Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting objects, launching applications, and the like.

As an example, gesture library 330 may include entries that describe a menu prompt gesture, menu activation gesture, a menu sliding gesture, a selection gesture, and menu positioning motions. Gesture detector 324 may process image data from image capture devices 138 to analyze configurations, positions, motions, and/or orientations of a user's hand to identify a menu prompt gesture, menu activation gesture, menu sliding gesture, selection gesture, and menu positioning motions etc. that may be performed by users. The rendering engine 322 can render a menu and virtual hand based on detection of the menu prompt gesture, menu activation gesture, menu sliding gesture, and menu positioning motions. The user interface engine 328 can define the menu that is displayed and can control actions that are performed in response to selections cause by selection gestures.

Figure 4:
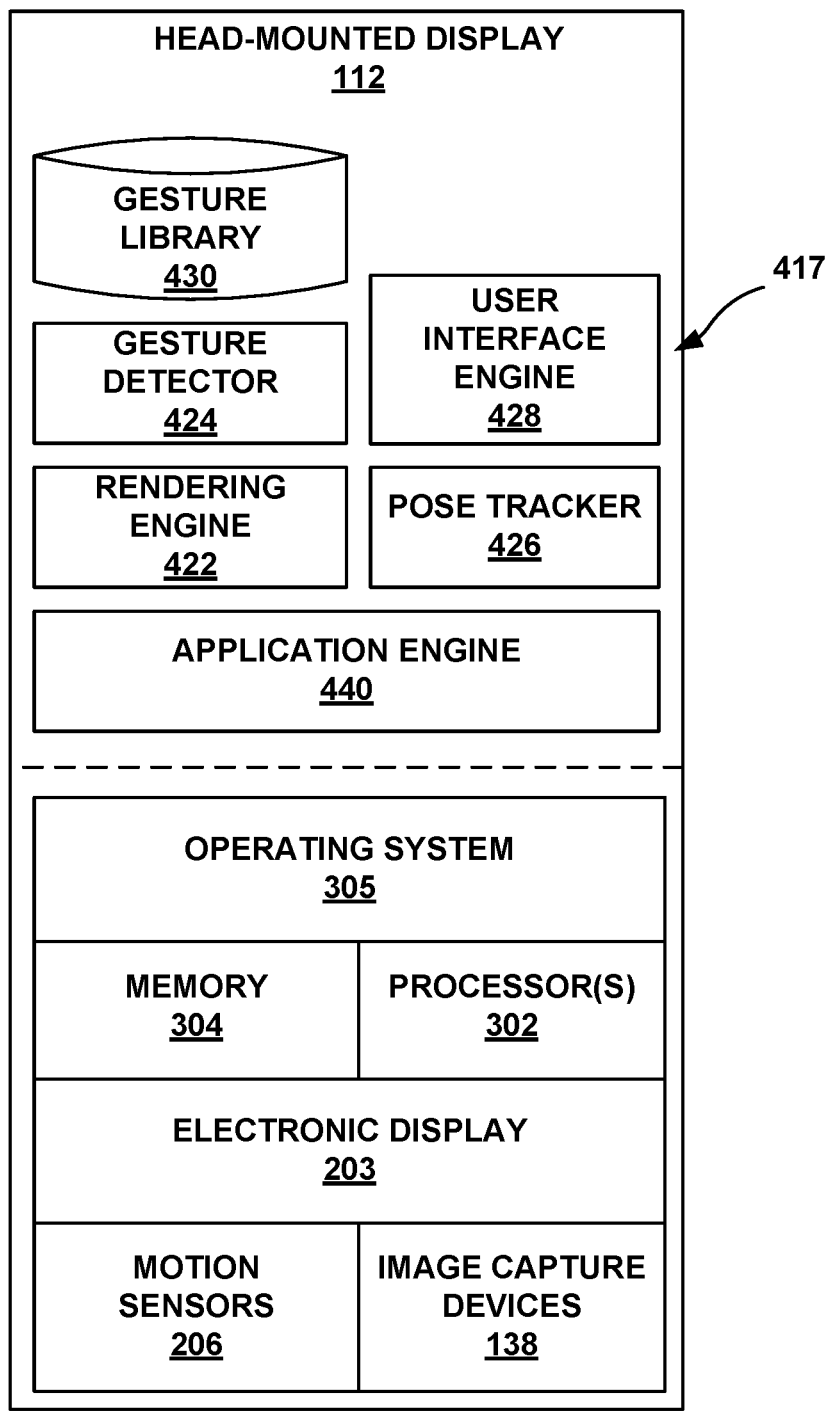
FIG. 4 is a block diagram depicting an example in which gesture detection and user interface generation is performed by the HMD of the artificial reality systems of FIGS. 1A, 1B in accordance with the techniques of the disclosure.

FIG. 4 is a block diagram depicting an example in which gesture detection and user interface generation is performed by HMD 112 of the artificial reality systems of FIGS. 1A, 1B in accordance with the techniques of the disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct user interface elements overlaid on, or as part of, the artificial content for display to user 110 in accordance with detected gestures of user 110. In some examples, rendering engine 422 constructs the 3D, artificial reality content which may be overlaid, at least in part, upon the real-world, physical environment of user 110.

Similar to the examples described with respect to FIG. 3, based on the sensed data, gesture detector 424 analyzes the tracked motions, configurations, positions, and/or orientations of objects (e.g., hands, arms, wrists, fingers, palms, thumbs) of the user to identify one or more gestures performed by user 110. In accordance with the techniques of the disclosure, user interface engine 428 generates user interface elements as part of, e.g., overlaid upon, the artificial reality content to be displayed to user 110 and/or performs actions based on one or more gestures or combinations of gestures of user 110 detected by gesture detector 424. More specifically, gesture detector 424 analyzes objects recognized within image data captured by image capture devices 138 of HMD 112 and/or sensors 90 or external cameras 102 to identify a hand and/or arm of user 110, and track movements of the hand and/or arm relative to HMD 112 to identify gestures performed by user 110. Gesture detector 424 may track movement, including changes to position and orientation, of the hand, digits, and/or arm based on the captured image data, and compare motion vectors of the objects to one or more entries in gesture library 430 to detect a gesture or combination of gestures performed by user 110.

Gesture library 430 is similar to gesture library 330 of FIG. 3. Each of the entries in gesture library 430 may specify, for the defined gesture or series of gestures, conditions that are required for the gesture to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

In response to detecting a matching gesture or combination of gestures, HMD 112 performs the response or action assigned to the matching entry in gesture library 430. For example, in accordance with the techniques of this disclosure, certain specialized gestures may be pre-defined such that, in response to gesture detector 424 detecting one of the pre-defined gestures, user interface engine 428 dynamically generates a user interface as an overlay to artificial reality content being displayed to the user, thereby allowing the user 110 to easily invoke a user interface for configuring HMD 112 while viewing artificial reality content. In other examples, in response to gesture detector 424 detecting one of the pre-defined gestures, user interface engine 428 and/or application engine 440 may receive input, select values or parameters associated with user interface elements, launch applications, modify configurable settings, send messages, start or stop processes or perform other actions.

As an example, gesture library 430 may include entries that describe a menu prompt gesture, menu activation gesture, a menu sliding gesture, menu positioning motions, and a selection gesture. Gesture detector 424 can utilize image data from image capture devices 138 to analyze configurations, positions, and/or orientations of a user's hand to identify a menu prompt gesture, menu activation gesture, menu sliding gesture, selection gesture, or menu positioning motions, etc., that may be performed by users. The rendering engine 422 can render a UI menu, slidably engageable element, and/or virtual hand based on detection of the menu activation gesture, menu sliding gesture, selection gesture, and menu positioning motions. The user interface engine 328 can define the menu that is displayed and can control actions performed by application engine 440 in response to selections caused by selection gestures.

Figure 5:
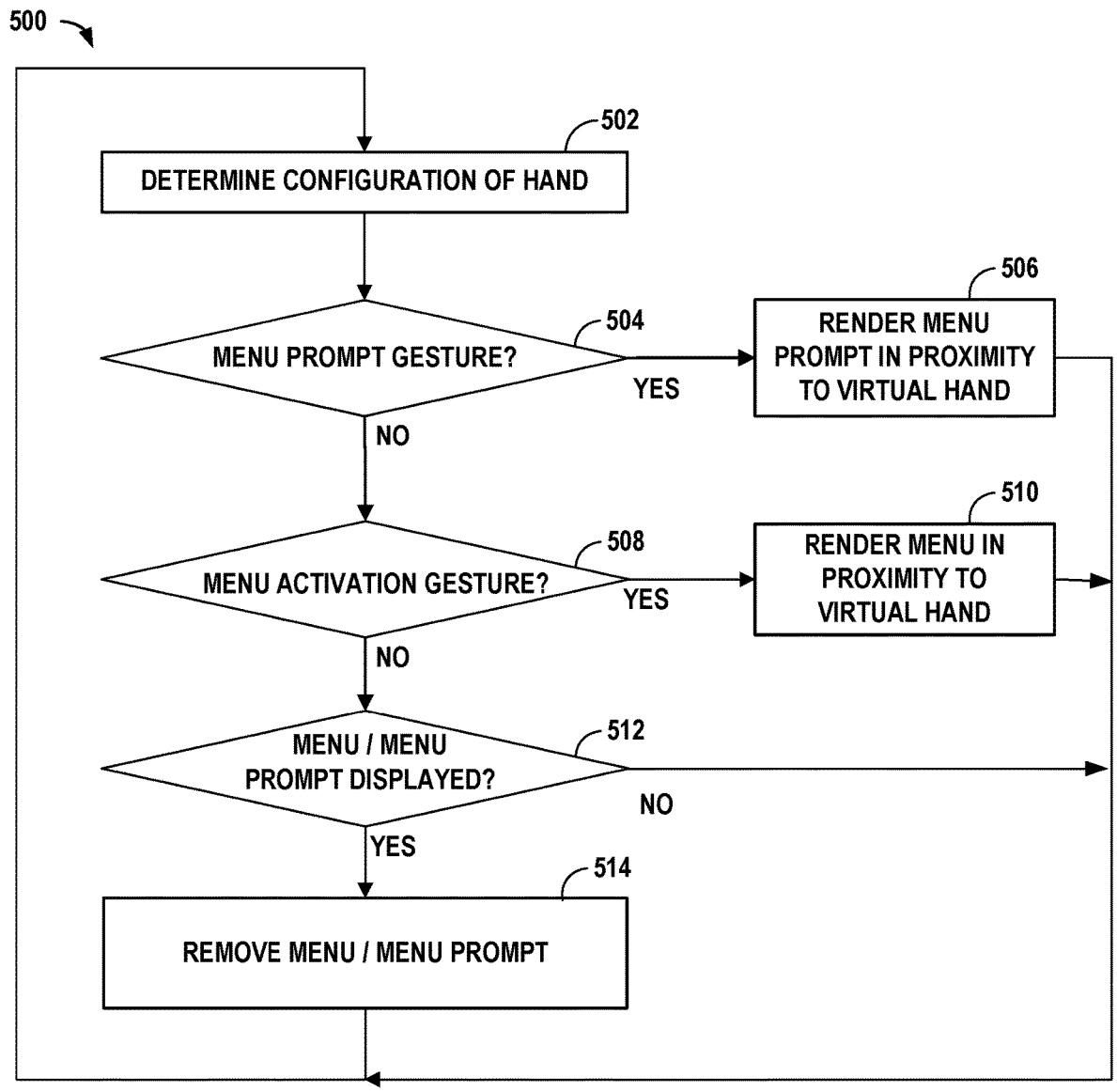
FIG. 5 is a flowchart illustrating operations of an example method for activating a menu prompt or a UI menu in accordance with aspects of the disclosure.
Figure 6:
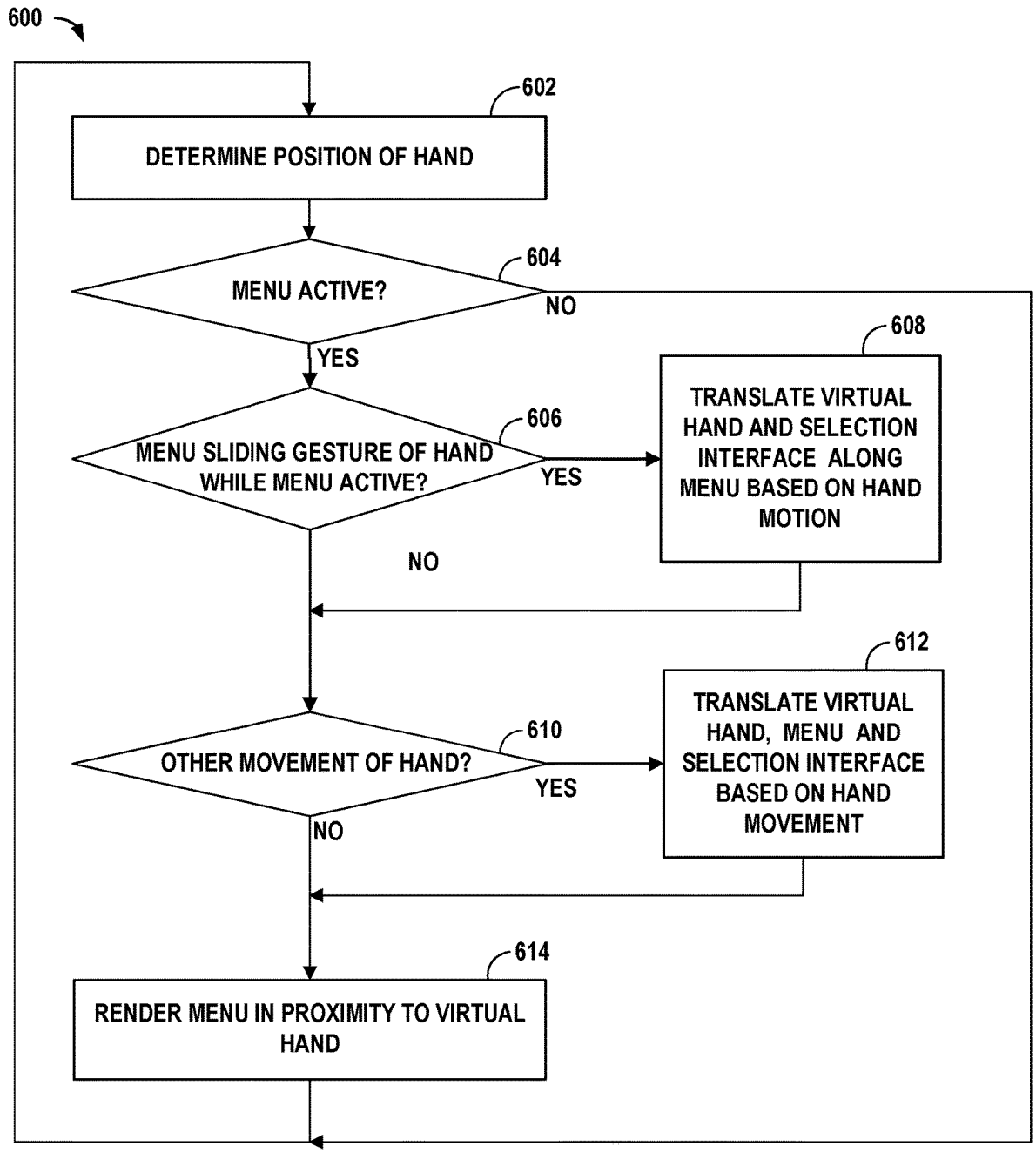
FIG. 6 is a flowchart illustrating operations of an example method for positioning and interacting with a UI menu in accordance with aspects of the disclosure.

FIGS. 5 and 6 are flowcharts illustrating example methods for activating menu prompts and menus, and for determining positioning and user interaction with menus. The operations illustrated in FIGS. 5 and 6 may be performed by one or more components of an artificial reality system, such as artificial reality systems 10, 20 of FIGS. 1A, 1B. For instance, some or all of the operations may be performed by one or more of gesture detector (324, 424 of FIGS. 3 and 4), a user interface engine (328, 428 of FIGS. 3 and 4), and a rendering engine (322, 422 of FIGS. 3 and 4).

FIG. 5 is a flowchart illustrating operations of an example method for activating a menu prompt or a menu interface in accordance with aspects of the disclosure. As noted above, certain configurations of a hand may be detected and used to trigger activation of a menu interface or menu prompt. The artificial reality system may determine a current configuration of a hand (502). The configuration may include an orientation of the hand and positioning of digits of the hand with respect to one another. In one or more aspects, image data may be captured and analyzed to determine the configuration of the hand. Other sensor data may be used in addition to, or instead of, image data to determine the configuration of the hand.

The artificial reality system may determine if the current configuration of the hand indicates that the user is performing a menu prompt gesture (504). In one or more aspects, the artificial reality system can be configurable (for example, by the user) to determine a configuration of the left hand or the right hand. In one or more aspects, the artificial reality system can utilize data describing the current configuration of the hand and data in one or more entries of a gesture library that specify particular gestures to determine if the current configuration of the hand is a menu prompt gesture. In one or more aspects, the menu prompt gesture can be a configuration of the hand in which the hand is in a substantially upturned orientation, and a finger and the thumb of the user's hand are positioned such that a space exists between the finger and the thumb. For the menu prompt gesture, the finger and the thumb of the user's hand may form a "C" shape or pincer shape, where the finger and the thumb do not touch at the ends. Those of skill in the art having the benefit of the disclosure will appreciate that other configurations of a hand can be used as a menu prompt gesture.

In response to determining that the user has performed the menu prompt gesture, the artificial reality system may render a menu prompt (506). In one or more aspects, the menu prompt is rendered in proximity to a virtual hand representing the orientation of the user's hand. The menu prompt may be a UI element located between the virtual finger and virtual thumb of the virtual hand corresponding to the finger and thumb of the user performing the menu prompt gesture.

Figure 8:
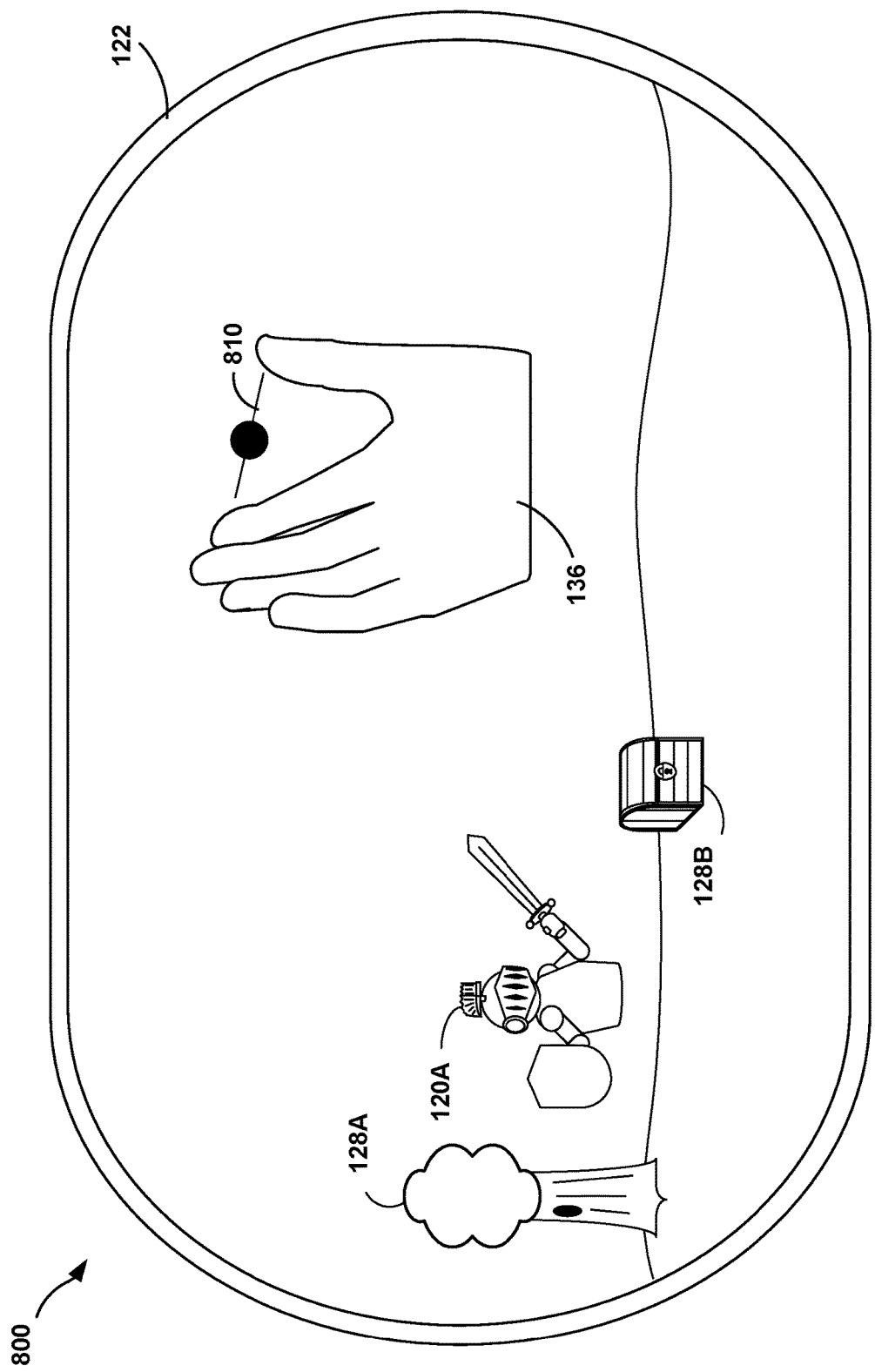
FIG. 8 is an example HMD display illustrating a menu prompt in accordance with aspects of the disclosure.

FIG. 8 is an example HMD display 800 illustrating a menu prompt 810 in accordance with aspects of the disclosure. In the example illustrated in FIG. 8, the user of the artificial reality system has placed their hand in a substantially upturned orientation with a space between the index finger and the thumb. (Other fingers beside the index finger may be used for the menu prompt and menu activation gestures.) The artificial reality system can determine the position and orientation of the hand and can render a virtual hand 136 to match the orientation of the user's hand and finger positioning. In addition, the artificial reality system can detect that the user has performed a menu prompt gesture with their hand based on the configuration of the hand. In response to detecting the menu prompt gesture, the artificial reality system can render a menu prompt 810 between the index finger and thumb of the virtual hand. The menu prompt 810 can be a user interface element that serves as an indicator or reminder (i.e., a prompt) to the user that the user can perform an action with the thumb and index finger (e.g., a pinching action) to place user's hand in a menu activation gesture to cause the artificial reality system to provide a menu to the user. In some aspects, the menu prompt 810 can include a line extending between the index finger and the thumb. In some aspects, the menu prompt 810 can include a virtual object positioned between the thumb and the index finger. In some aspects, the menu prompt 810 can include highlighting the index finger and/or the thumb. Other types of user interface elements can be rendered as a menu prompt 810. For example, arrows may be used to indicate the direction that the user's index finger and thumb should be moved in order to activate a menu.

Returning to FIG. 5, after rendering the menu prompt, the artificial reality system may determine a new current configuration of the hand (502). There may be many other operations performed by the artificial reality system in between rendering the menu prompt and determining a new configuration of the hand.

If the current configuration of the hand does not match a menu prompt gesture, the artificial reality system can determine if the current configuration of the hand indicates the user is performing a menu activation gesture. In one or more aspects, the artificial reality system can utilize data describing the current configuration of the hand and data in one or more entries of the gesture library to determine if the current configuration of the hand is a menu activation gesture. In one or more aspects, the menu activation gesture can be a configuration of the hand in which the hand is in a substantially upturned orientation, and a finger and the thumb of the user's hand are positioned in a pinching configuration. Those of skill in the art having the benefit of the disclosure will appreciate that other configurations of a hand can be used as a menu activation gesture. For example, the menu activation gesture may comprise a finger and thumb positioned in a pinching configuration irrespective of the orientation of the hand.

In response to determining that the user has performed the menu activation gesture, the artificial reality system can render a UI menu (510). In one or more aspects, the menu is rendered in proximity to a virtual hand representing the orientation of the user's hand. In some aspects, the artificial reality system may render the UI menu responsive to detecting a menu activation gesture only if the artificial reality system first detected a menu prompt gesture. In some aspects, the menu prompt gesture is not a prerequisite.

Figure 7A:
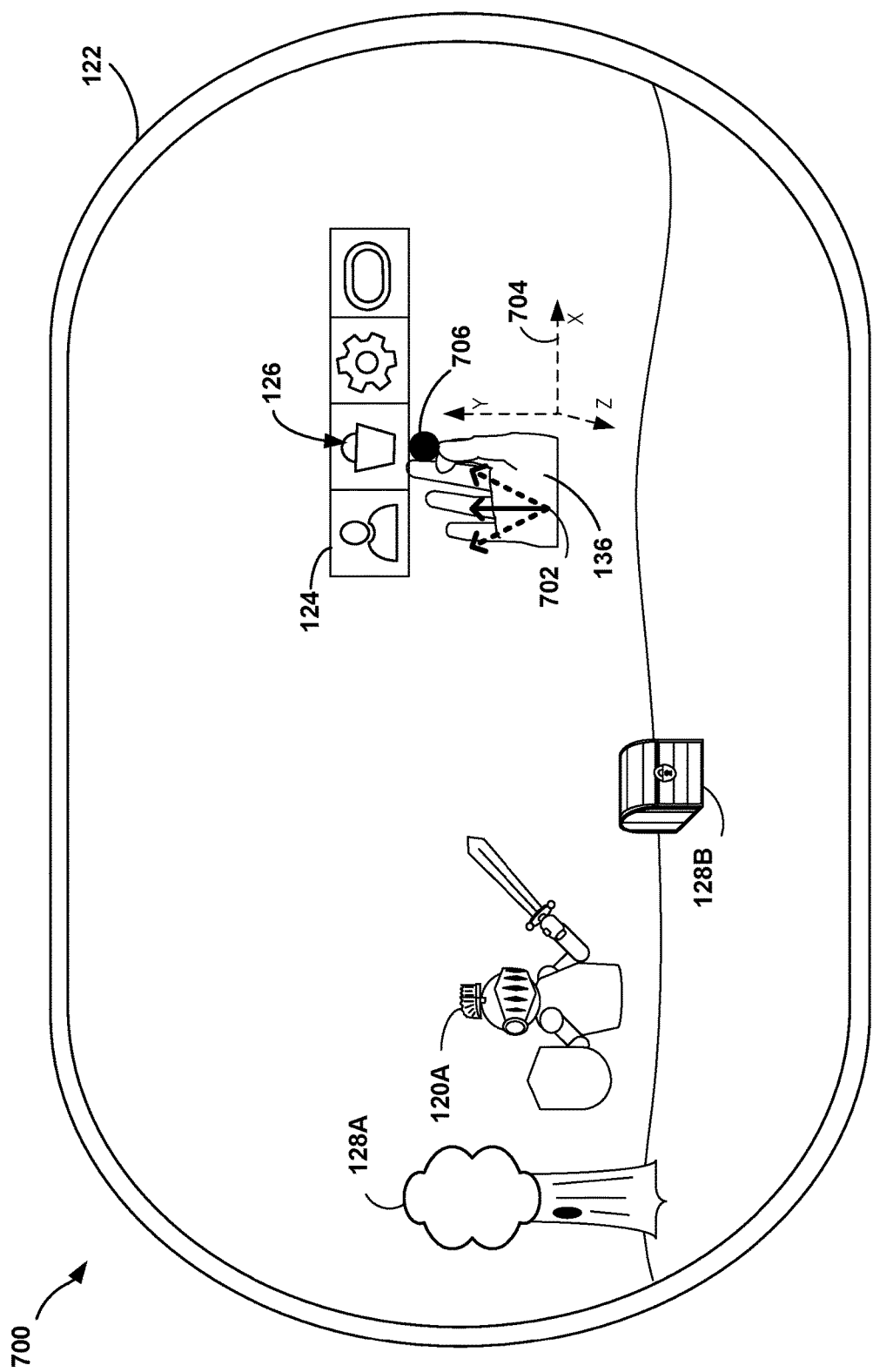
FIGS. 7A-7G are example HMD displays illustrating positioning and interacting with UI menus in accordance with aspects of the disclosure.

FIG. 7A is an example HMD display 700 depicting a UI menu 124 in accordance with aspects of the disclosure. In the example illustrated in FIG. 7A, the user of the artificial reality system has placed their hand in a substantially upturned orientation with the index finger and thumb of the hand in a pinching configuration. (Again, the index finger is being used as one example of a finger of the hand.) The artificial reality system can determine the position and orientation of the hand and can render a virtual hand 136 to represent the orientation of the user's hand and finger positioning. In addition, the artificial reality system can detect that the user has performed a menu activation gesture with their hand based on the configuration of the hand. In response to detecting the menu activation gesture, the artificial reality system can render a UI menu 124 in proximity to the virtual hand. The UI menu 124 can include one or more UI elements 126 that are arrayed along a dimension of the UI menu 124. In one or more aspects, the one or more UI elements 126 can be menu items arrayed along a horizontal dimension of a coordinate space such as a viewing space or display space. In the example illustrated in FIG. 7A, a coordinate axis 704 is shown solely to illustrate the coordinate space. The coordinate axis 704 need not be presented on the actual display. In the examples illustrated in FIGS. 7A-7G, the horizontal dimension is along the X axis, the vertical dimension is along the Y axis, and depth is along the Z axis.

As noted above, the menu activation gesture can include the user placing their hand in a substantially upturned orientation. For example, the artificial reality system can detect that a vector 702 normal to the palm of other surface of the hand is also substantially normal to the plane formed by the X axis and Z axis. In one or more aspects, the vector 702 can be considered substantially normal if the vector 702 is within thirty degrees of normal to the plane formed by the X axis and Z axis (illustrated by dashed lines). Other thresholds besides thirty degrees can be used in one or more aspects.

In one or more aspects, a slidably engageable UI element 706 may be rendered in proximity to the virtual hand 136. In the example illustrated in FIG. 7A, the slidably engageable UI element 706 is a circle. Other graphical elements such as spheres, triangles, squares, etc., or virtual hand 136 alone, can serve as the slidably engageable UI element 706. Additionally, a finger or fingers of virtual hand 136 can be highlighted to indicate that a highlighted portion of a finger or fingers is the slidably engageable UI element.

Figure 7B:
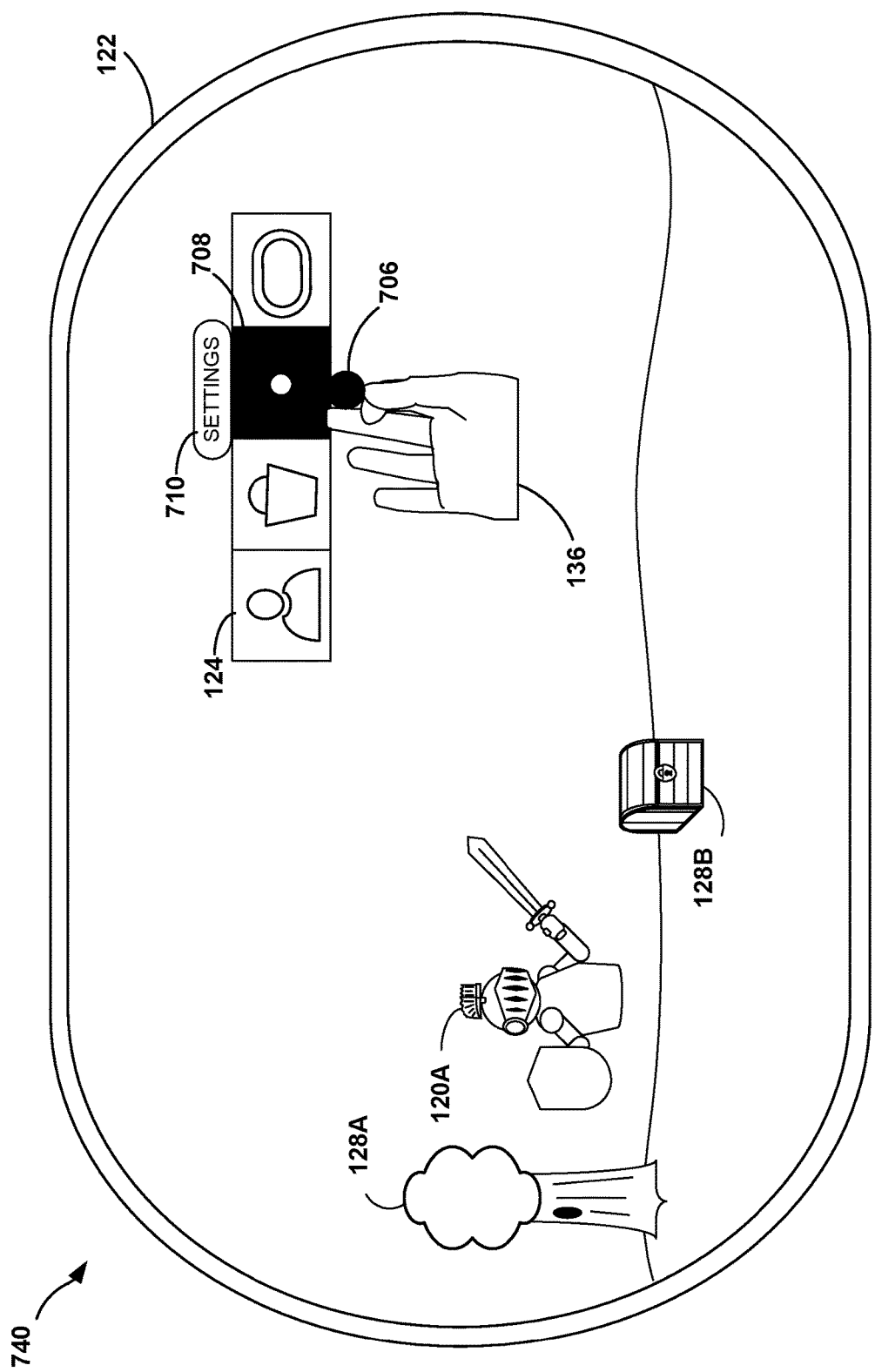

FIG. 7B is an example HMD display 740 illustrating a UI menu and slidably engageable UI element in accordance with aspects of the disclosure. In the example illustrated in FIG. 7B, the user has performed a menu sliding gesture so as to cause artificial reality system to render the slidably engageable UI element 706 at a position in proximity to menu item 708. In one or more aspects, the menu item 708 in proximity to the slidably engageable UI element 706 can be highlighted or otherwise augmented or modified to indicate that the menu item 708 will be selected upon the user performing a selection gesture 708. A label 710 can be provided in proximity to the menu element 708 in addition to, or instead of highlighting the menu item 708. Various highlighting mechanisms can be used, including border highlighting, background highlighting, blinking, enlargement, etc. may be used to highlight the menu item 708. Highlighting menu element 708 can indicate that menu element 708 will be selected if the user performs a selection gesture. In one or more aspects, the selection gesture can be movement of a finger of the hand that is different from the finger in the pinching configuration, e.g., releasing the pinching configuration. In one or more aspects, the selection gesture can be a movement of the hand in a direction that is substantially normal to the plane of the UI menu. As used herein, "substantially normal" to a plane may indicate within 0-2 degrees of the normal to the plane, within 0-5 degrees of the normal to the plane, within 0-10 degrees of the normal to the plane, within 0-20 degrees of the normal to the plane, or within 0-30 degrees of the normal to the plane. In one or more aspects, the selection gesture can be reconfiguring the thumb and the finger of the hand to no longer be in the pinching configuration. In one or more aspect, the selection gesture may be a motion or reconfiguration of a different finger (e.g., the pinky finger), such as to curl or extend. Detection of the selection gesture may cause the artificial reality system to perform some action. For example, the selection gesture may cause an application to be instantiated, or can cause a currently running application to be brought into the foreground of the display of the HMD, or in some cases may cause the artificial reality system to perform some action within the particular executing artificial reality application.

Thus, a sequence of gestures may be used to trigger display of a menu 124, position the slidably engageable UI element 706 over, or in proximity to a menu element 708 of the menu 124, and select the menu element 708. In an example implementation, a user can perform a menu activation gesture (e.g., position the fingers of a hand in a pinching configuration) to cause a menu 124 to be displayed by the HMD. The user can perform a menu sliding gesture (e.g., move their hand while maintaining the pinching configuration) to cause a slidably engageable UI element 706 to slide along the menu 124 in accordance with the motion of the hand. The user may then perform a selection gesture (e.g., release the finger and thumb from the pinching configuration) to select the menu element 708 indicated by the slidably engageable UI element 706.

Returning to FIG. 5, after rendering the UI menu 124, artificial reality system may determine a new current configuration of the hand (502). There may be many other operations performed by the artificial reality system in between rendering the UI menu 124 and determining a new configuration of the hand.

If the artificial reality system detects that the user's hand is no longer performing a menu prompt gesture or a menu activation gesture, then the artificial reality system can determine if a UI menu 124 or menu prompt 810 has been displayed. If so, the artificial reality system can remove the UI menu 124 or menu prompt 810 from the display (514) because the user's hand is no longer in the appropriate configuration to display the UI menu 124 or menu prompt 810.

After removing the UI menu 124 or menu prompt 810, the flow returns to determine a new current configuration of the hand (502). There may be many other operations performed by the artificial reality system in between removing the UI menu 124 or menu prompt 810 and determining a new configuration of the hand.

FIG. 6 is a flowchart illustrating operations of an example method for positioning and interacting with a UI menu in accordance with aspects of the disclosure. The artificial reality system may determine a position of the hand (602). For example, the position can be determined from image data captured from image sensors or from other types of sensors coupled with the artificial reality system.

The artificial reality system may determine if the UI menu is currently active (i.e., is being rendered and displayed via the HMD) (604). If the UI menu is not currently active, flow can return to determining an updated position of the hand (602). There may be many other operations performed by the artificial reality system in between determining if the UI menu is active and determining an updated position of the hand.

If the UI menu is active, then the artificial reality system can determine if the user has performed a menu sliding gesture (606). In some aspects, the menu sliding gesture can be substantially horizontal motion of the hand while the menu is active (e.g. while the user's hand is performing a menu activation gesture). For example, the artificial reality system can compare a previous position of the hand with a current position of the hand to determine if a menu sliding gesture has occurred. If the menu sliding gesture is detected, then the artificial reality system can translate the virtual hand and/or slidably engageable interface element along the UI menu 124 in accordance with the menu sliding gesture (608). If the menu items are oriented vertically, then the menu sliding gesture can be substantially vertical motion of the hand. If the menu sliding gesture is not detected the artificial reality system can determine if other motion of the hand is detected that is not the menu sliding gesture (610). "Substantially" vertical and horizontal may be within 5 degrees, 10 degrees, 20 degrees, or 30 degrees of vertical or horizontal.

Figure 7C:
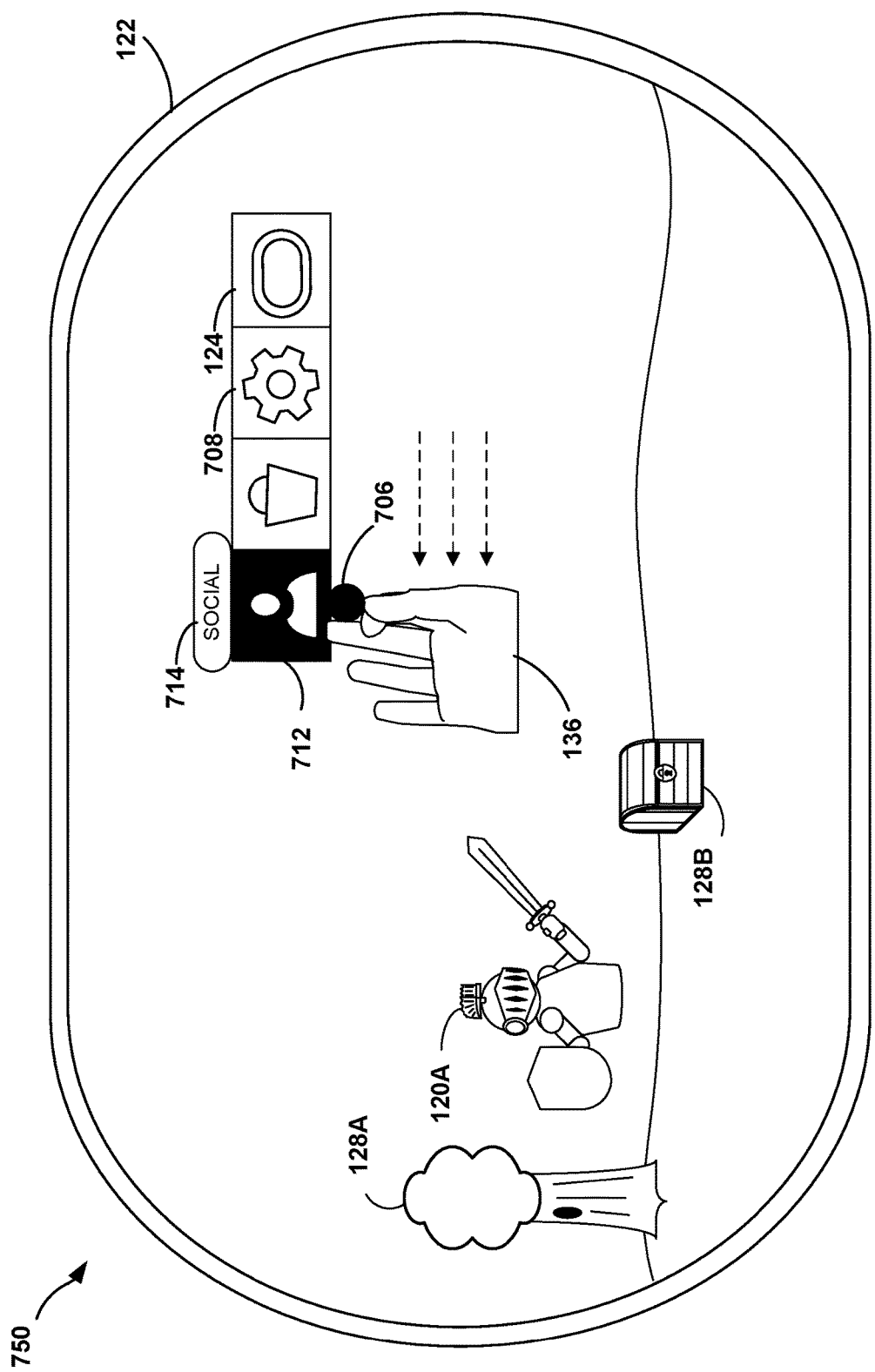

FIG. 7C is an example HMD display 750 illustrating a UI menu and menu sliding gesture in accordance with aspects of the disclosure. In one or more aspects, the menu sliding gesture can be motion of the user's hand along a horizontal dimension of the UI menu 124 (e.g., motion parallel to an X axis). In the example illustrated in FIG. 7C, the user has moved their hand (while maintaining the menu activation gesture) along a horizontal dimension of the UI menu 124. The artificial reality system can reposition the virtual hand 136 and the slidably engageable UI element 706 in accordance with the motion of the user's hand such that the virtual hand 136 and slidably engageable UI element 706 are in proximity to menu item 712. The artificial reality system can remove highlighting from menu element 708 and can highlight menu element 712 to indicate that menu element 712 will be selected if the user performs the selection gesture. A label 714 can be displayed in addition to, or instead of highlighting the menu item 712. In some examples, the artificial reality system does not highlight menu items. In some examples, the artificial reality system does not render UI element 706. In one or more aspects, the UI menu 124 remains in the same position in the horizontal direction as it was in prior to the menu sliding gesture. In other words, the UI menu 124 is horizontally stationary while the virtual hand 136 and slidably engageable UI element 706 move along the horizontal dimension of the UI menu 124 responsive to the user performing the menu sliding gesture.

Returning to FIG. 6, after determining whether or not horizontal motion has been detected, the artificial reality system can determine if non-horizontal motion by the user hand has occurred (610). For example, the artificial reality system can determine if there has been motion in a vertical direction (i.e., motion parallel to the Y axis) and/or front-to-back or back-to-front motion (i.e., motion parallel to the Z axis). If non-horizontal motion of the user's hand is detected, the artificial reality system can translate the position of the virtual hand, slidably engageable UI element, and UI menu based with the non-horizontal motion. In examples where the UI menu items are arrayed vertically, the non-vertical motion of the user's hand constitutes the "other movement" of the hand.

Figure 7D:
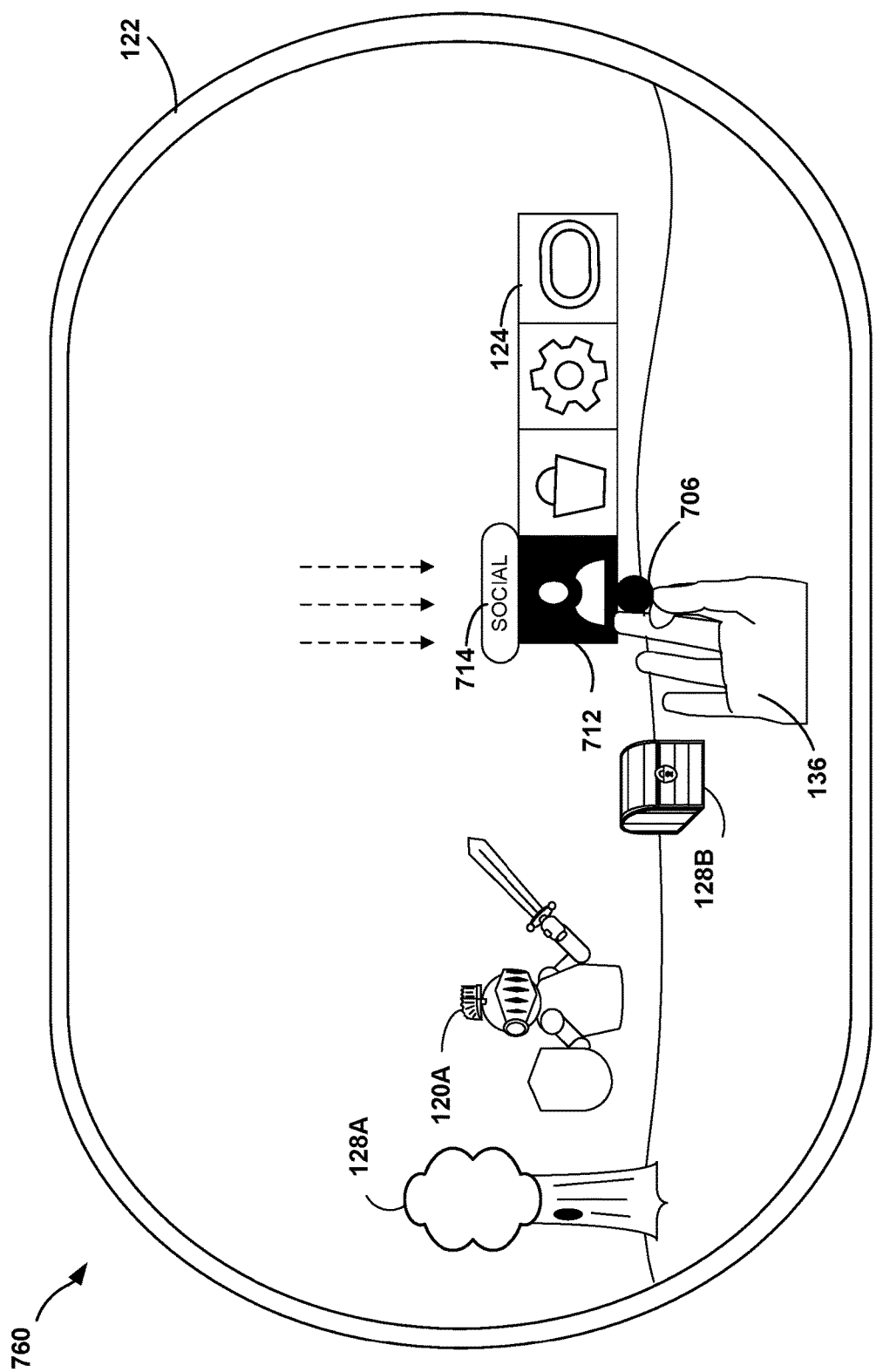

FIG. 7D is an example HMD display 760 illustrating a UI menu after vertical motion has been detected. In the example illustrated in FIG. 7D, the user has moved their hand downward. The artificial reality system can detect the vertical motion, and can translate the position of the UI menu 124, virtual hand 136 and slidably engageable UI element 706 based on the detected vertical motion. In some aspects, if there is no horizontal motion detected in addition to the vertical motion, the virtual hand 136 and slidably engageable UI element 706 remain in their previous position with respect to the UI menu 124. Thus, the same menu element 712 remains highlighted as the vertical motion occurs.

Figure 7E:
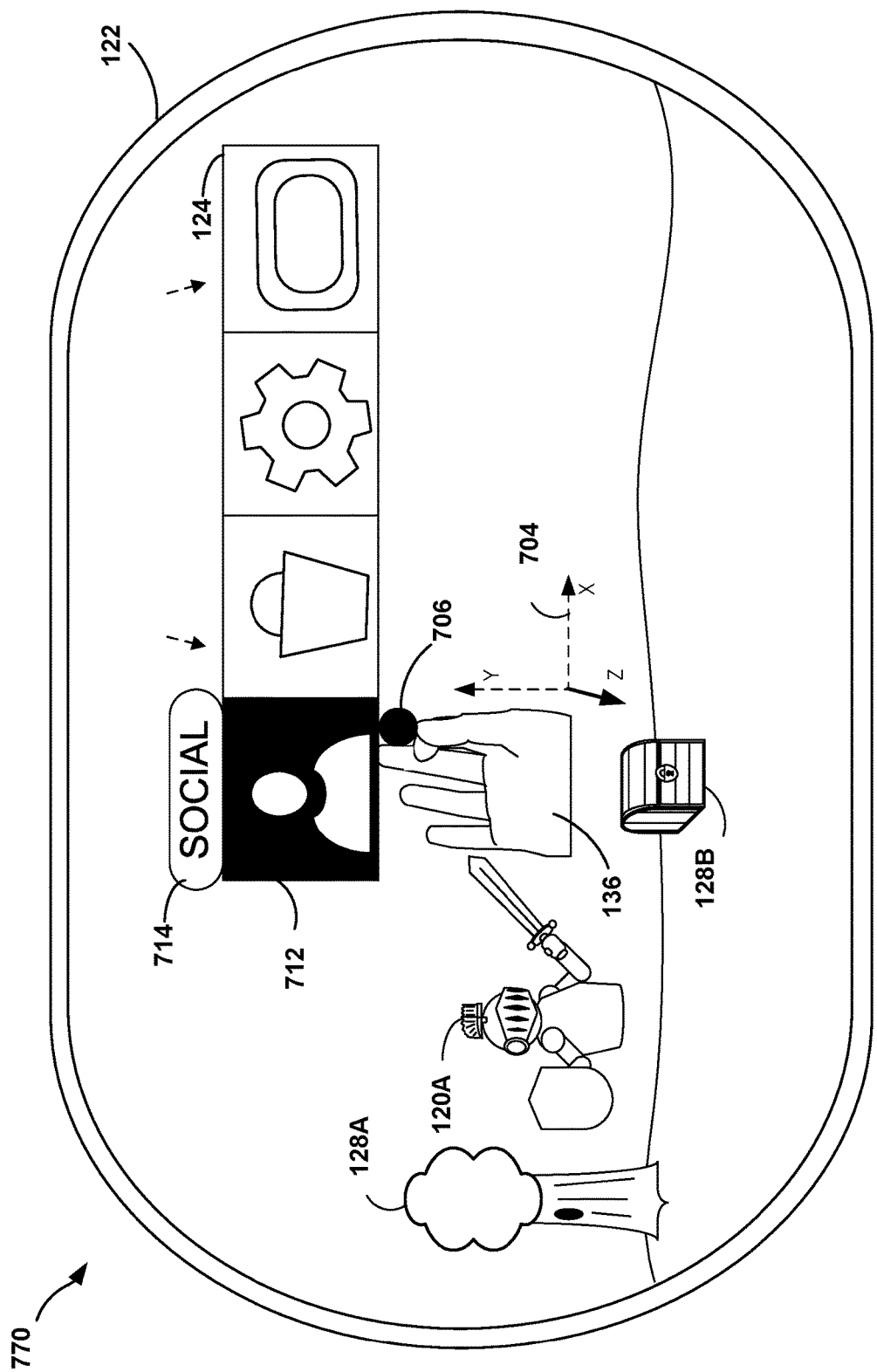

FIG. 7E is an example HMD display 770 illustrating a UI menu after back-to-front motion has been detected (i.e., the user has moved their hand closer to themselves along the Z axis). The artificial reality system can detect the back-to-front motion and can translate the position of the UI menu 124, virtual hand 136 and slidably engageable UI element 706 based on the detected back-to-front motion. Thus, the position of the virtual hand, UI menu 124, and slidably engageable UI element 706 appear to be larger, and thus closer to the user. In some aspects, if there is no horizontal motion detected in addition to the motion along the Z axis, the virtual hand 136 and slidably engageable UI element 706 remain in their previous position with respect to the UI menu 124. Thus, the same menu element 712 remains highlighted as the motion along the Z axis occurs.

Returning to FIG. 6, after the UI menu, virtual hand, and slidably engageable UI element have been translated according to motion of the user's hand (if any), the artificial reality system can render the virtual hand and slidably engageable UI element in proximity to the UI menu 124 based on the current position of the user hand. Flow can then return to determine an updated position of the hand (602). There may be many other operations performed by the artificial reality system in between rendering the UI menu determining an updated position of the hand.

Figure 7F:
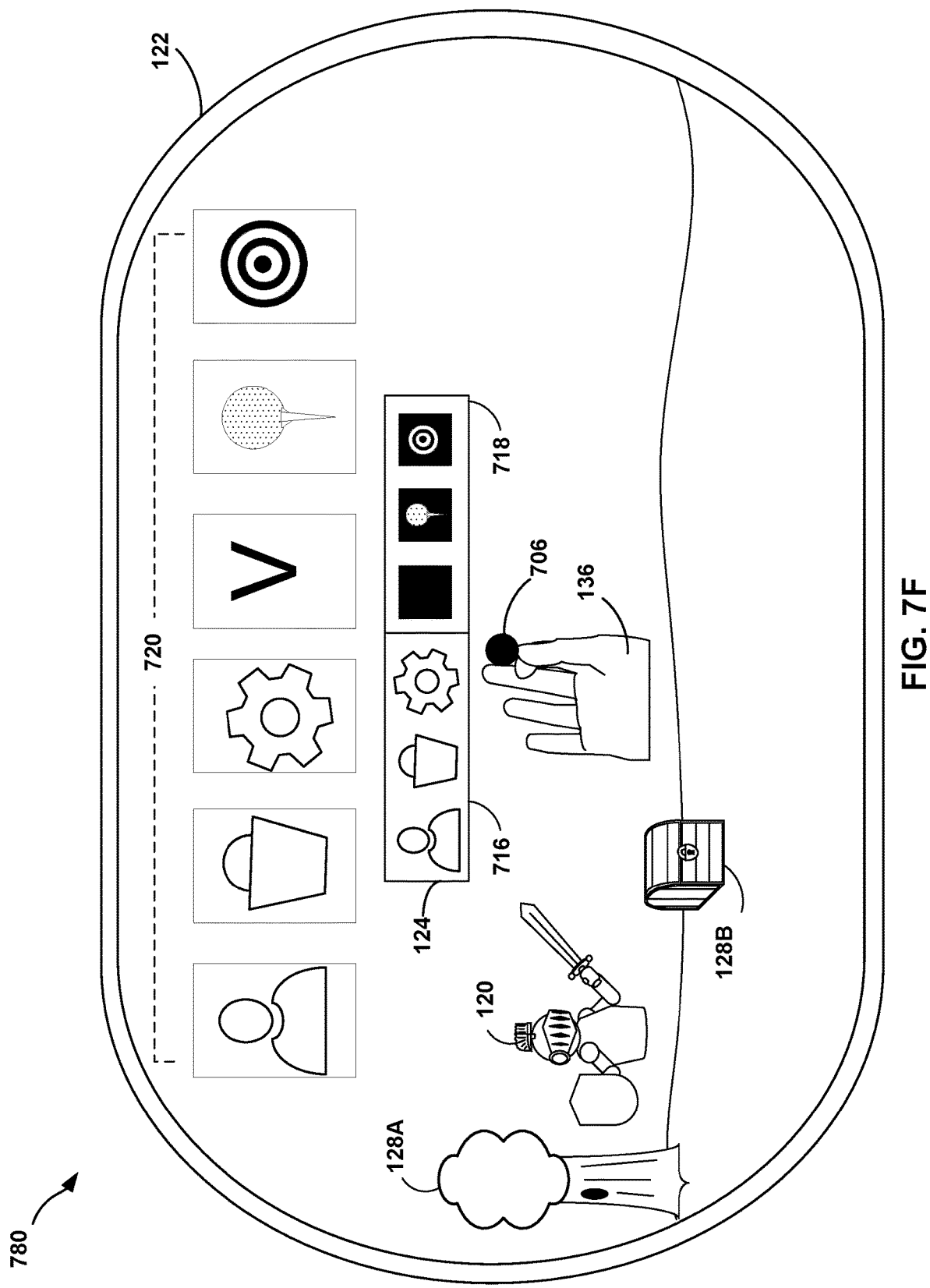

FIG. 7F is an example HMD display 780 illustrating a UI menu 124 and UI icon array 720 in accordance with aspects of the disclosure. In some aspects, the menu items of a UI menu 124 can correspond to applications. In one or more aspects, UI menu 124 can be divided into two portions 716 and 718. The menu elements in portion 716 can represent favorite applications, and the menu elements in portion 718 can represent applications currently running within the artificial reality system. Further, in some aspects, the artificial reality system can present an icon array 710 of icons representing applications available or running in the artificial reality system. The images on the individual icons in icon array 720 can represent a current display of the corresponding application, or an image associated with the application.

Figure 7G:
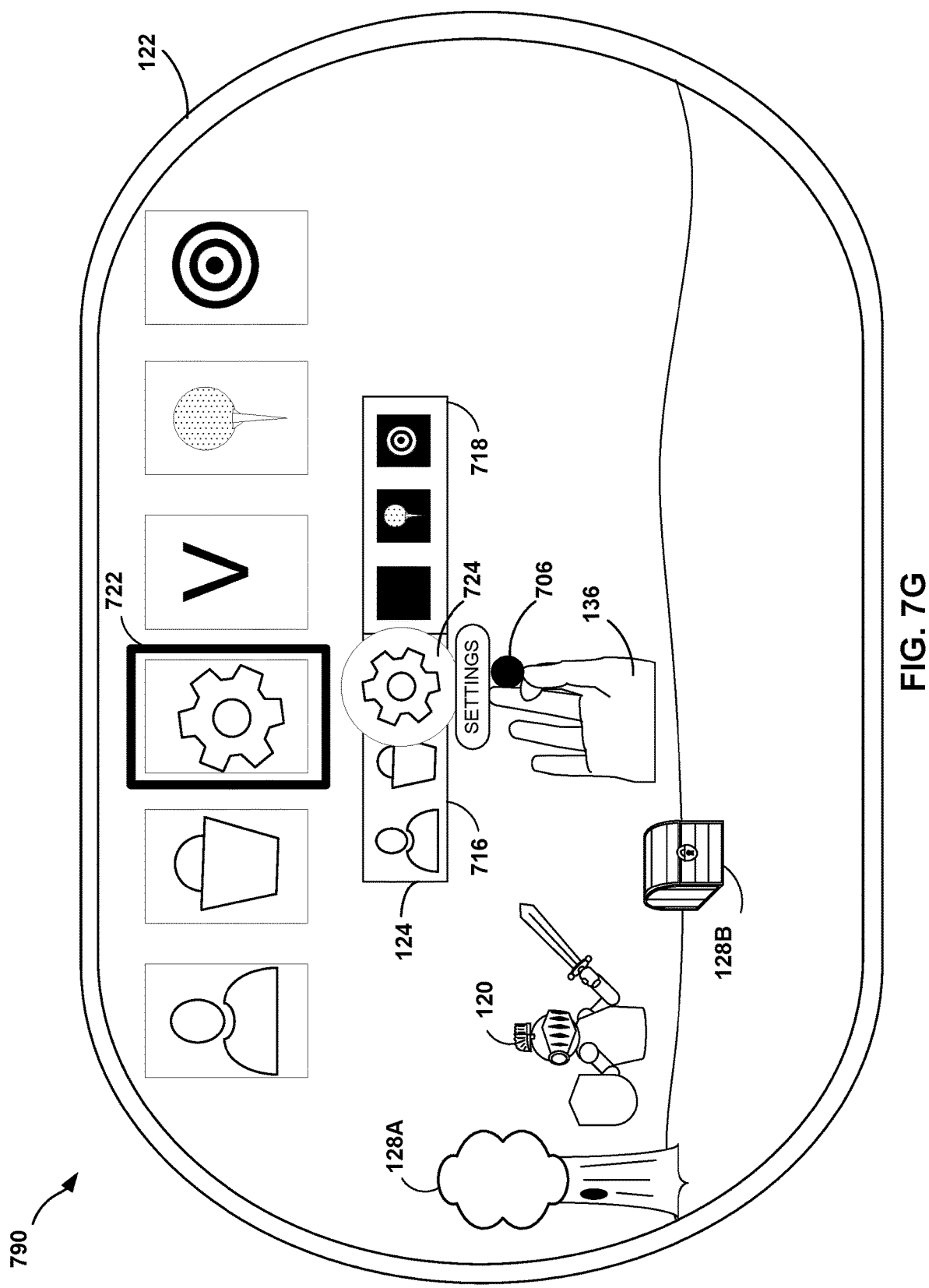

FIG. 7G is an example HMD display 790 illustrating a UI menu 124 and UI icon array 720 in accordance with aspects of the disclosure. In the example illustrated in FIG. 7G, the virtual hand 136 and slidably engageable UI element 706 are in proximity to a menu item 724. In this example, a three-dimensional highlighting is used, where the menu item in proximity to the slidably engageable UI element 706 can be brought forward, thereby making the image appear larger to the user. In addition, the icon 722 corresponding to the menu item 724 can also be highlighted. In this example, the boarder of the icon 722 is highlighted.

The discussion above has presented aspects of the artificial reality system in which the UI menu is configured in a horizontal direction. In other aspects, the UI menu can be configured in a vertical direction. In such aspects, vertical motion of the hand can cause the slidably engageable UI element and virtual hand to move along the vertical dimension of the UI menu while the UI menu remains stationary in the vertical direction. Non-vertical motion (i.e., horizontal motion or front-to-back motion) can cause translation of the position of the UI menu in accordance with the non-vertical motion.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
    an image capture device configured to capture image data;
    a head mounted display (HMD) configured to output artificial reality content;
        a gesture detector comprising processing circuitry configured to identify, from the image data, a menu activation gesture comprising a configuration of a hand in a substantially upturned orientation of the hand and a pinching configuration of a thumb and a finger of the hand and identify, from the image data and subsequent to the menu activation gesture, a menu sliding gesture comprising the configuration of the hand in combination with a motion of the hand;
        a user interface (UI) engine comprising processing circuitry configured to, in response to the menu activation gesture, generate a menu interface and a slidably engageable UI element at a first position relative to the menu interface, and in response to the menu sliding gesture, translate the slidably engageable UI element to a second position relative to the menu interface; and
        a rendering engine comprising processing circuitry configured to render the artificial reality content, the menu interface, and the translation of the slidably engageable UI element from the first position relative to the user interface to the second position relative to the user interface for display at the HMD.

2. The artificial reality system of claim 1,
    wherein the menu interface comprises one or more menu items arrayed along a dimension of the menu interface, and
    wherein the UI engine is configured to highlight one of the menu items according to a position of the slidably engageable UI element relative to the menu interface.

3. The artificial reality system of claim 2, wherein the one or more menu items correspond to respective applications executing on the artificial reality system.

4. The artificial reality system of claim 1,
    wherein the menu interface comprises one or more menu items arrayed along a dimension of the menu interface,
    wherein to translate the slidably engageable UI element to the second position relative to the menu interface, the UI engine is configured to slide the slidably engageable UI element along the dimension of the menu interface to the second position relative to the menu interface.

5. The artificial reality system of claim 1,
    wherein the menu sliding gesture comprises motion of the hand in a substantially first direction,
    wherein the gesture detector is configured to identify, from the image data, motion of the hand in a substantially second direction subsequent to the menu activation gesture, the substantially second direction being substantially orthogonal to the substantially first direction,
    wherein the UI engine is further configured to, in response to the motion of the hand in the substantially second direction, translate the slidably engageable UI element and the menu interface while retaining a position of the slidably engageable UI element relative to the menu interface.

6. The artificial reality system of claim 1, further comprising:
    an application engine comprising processing circuitry for execution of one or more artificial reality applications,
    wherein the gesture detector is configured to identify, from the image data, a selection gesture subsequent to the menu sliding gesture, and
    wherein the application engine is configured to perform an action in response to the selection gesture.

7. The artificial reality system of claim 6, wherein the selection gesture comprises one of (1) movement of a different finger of the hand, (2) translation of the hand in a direction that is substantially normal to the menu interface, or (3) reconfiguring the thumb and the finger of the hand to no longer be in the pinching configuration.

8. The artificial reality system of claim 1,
wherein the gesture detector is further configured to identify, from the image data, a menu prompt gesture prior to the menu activation gesture, and
wherein the UI engine is further configured to generate a menu prompt element in response to the menu prompt gesture.

9. The artificial reality system of claim 8, wherein the menu prompt gesture comprises the hand configured in a substantially upturned position with a space between a thumb and a finger, and
wherein the UI engine generates the menu prompt element in the space between a thumb and a finger of a virtual hand.

10. The artificial reality system of claim 9, wherein the menu prompt element comprises a line between the thumb and the finger of the virtual hand.

11. The artificial reality system of claim 1, wherein the image capture device is integrated with the HMD.

12. A method comprising:
obtaining, by an artificial reality system including a head mounted display (HMD), image data via an image capture device;
identifying, by the artificial reality system from the image data, a menu activation gesture, the menu activation gesture comprising a configuration of a hand in a substantially upturned orientation of the hand and a pinching configuration of a thumb and a finger of the hand;
generating, by the artificial reality system in response to the menu activation gesture, a menu interface and a slidably engageable UI element at a first position relative to the menu interface;
identifying, from the image data and subsequent to the menu activation gesture, a menu sliding gesture comprising the configuration of the hand in combination with a motion of the hand;
in response to the menu sliding gesture, translate the slidably engageable UI element to a second position relative to the menu interface, and
rendering, by the artificial reality system, artificial reality content, the menu interface, and the translation of the slidably engageable UI element from the first position relative to the menu interface to the second position relative to the user interface for display at the HMD.

13. The method of claim 12, wherein the menu interface comprises one or more menu items arrayed along a dimension of the menu interface, the method further comprising:
highlighting, by the artificial reality system, one of the menu items according to a position of the slidably engageable UI element relative to the menu interface.

14. The method of claim 12, wherein translating the slidably engageable UI element to the second position relative to the menu interface comprises sliding the slidably engageable UI element along a dimension of the menu interface to the second position relative to the menu interface.

15. The method of claim 12,
wherein the menu sliding gesture comprises motion of the hand in a substantially first direction, the method further comprising:
identifying, by the artificial reality system from the image data, motion of the hand in a substantially second direction subsequent to the menu activation gesture, the substantially second direction being substantially orthogonal to the substantially first direction; and
translating, by the artificial reality system in response to the motion of the hand in the substantially second direction, the slidably engageable UI element and the menu interface while retaining a position of the slidably engageable UI element relative to the menu interface.

16. The method of claim 12, further comprising:
identifying, by the artificial reality system from the image data, a menu prompt gesture; and
generating, by the artificial reality system, a menu prompt element in response to the menu prompt gesture.

17. A non-transitory, computer-readable medium comprising instructions that, when executed, cause one or more processors of an artificial reality system to:
capture image data via an image capture device;
identify, from the image data, a menu activation gesture comprising a configuration of the hand;
in response to the menu activation gesture, generate a menu interface and a slidably engageable UI element at a first position relative to the menu interface;
identify, subsequent to the menu activation gesture, a menu sliding gesture comprising the configuration of the hand in combination with a motion of the hand;
in response to the menu sliding gesture, translate the slidably engageable UI element to a second position relative to the menu interface; and
render artificial reality content, the menu interface, and the slidably engageable UI element for display at a head mounted display (HMD).

18. The non-transitory, computer-readable medium of claim 17, wherein the instructions further cause the one or more processors to:
identify, from the image data, a menu prompt gesture comprising the hand configured in a substantially upturned position with a space between a thumb and a finger; and
generate, in the space between a thumb and a finger of a virtual hand, a menu prompt element in response to the menu prompt gesture.

* * * * *